(12) United States Patent
Cooper

(10) Patent No.: US 8,524,146 B2
(45) Date of Patent: Sep. 3, 2013

(54) ROTARY DEGASSERS AND COMPONENTS THEREFOR

(76) Inventor: Paul V. Cooper, Chesterland, OH (US)

(*) Notice: Subject to any disclaimer, the term of this patent is extended or adjusted under 35 U.S.C. 154(b) by 56 days.

(21) Appl. No.: 12/878,984

(22) Filed: Sep. 9, 2010

(65) Prior Publication Data

US 2011/0163486 A1 Jul. 7, 2011

Related U.S. Application Data

(63) Continuation-in-part of application No. 12/853,255, filed on Aug. 9, 2010.

(60) Provisional application No. 61/240,981, filed on Sep. 9, 2009, provisional application No. 61/232,384, filed on Aug. 7, 2009.

(51) Int. Cl.
*F04B 17/00* (2006.01)

(52) U.S. Cl.
USPC .............................. 266/217; 266/233; 266/235

(58) Field of Classification Search
USPC .................................. 266/217, 216, 233, 235
See application file for complete search history.

(56) References Cited

U.S. PATENT DOCUMENTS

| | | | |
|---|---|---|---|
| 35,604 A | 6/1862 | Guild |
| 116,797 A | 7/1871 | Barnhart |
| 209,219 A | 10/1878 | Bookwalter |
| 251,104 A | 12/1881 | Finch |
| 364,804 A | 6/1887 | Cole |
| 390,319 A | 10/1888 | Thomson |
| 495,760 A | 4/1893 | Seitz |
| 506,572 A | 10/1893 | Wagener |
| 585,188 A | 6/1897 | Davis |
| 757,932 A | 4/1904 | Jones |
| 882,477 A | 3/1908 | Neumann |
| 882,478 A | 3/1908 | Neumann |
| 890,319 A | 6/1908 | Wells |
| 898,499 A | 9/1908 | O'Donnell |
| 909,774 A | 1/1909 | Flora |
| 919,194 A | 4/1909 | Livingston |
| 1,037,659 A | 9/1912 | Rembert |
| 1,100,475 A | 6/1914 | Franckaerts |
| 1,196,758 A | 9/1916 | Blair |

(Continued)

FOREIGN PATENT DOCUMENTS

| CA | 683469 | 3/1964 |
| CA | 2115929 | 8/1992 |

(Continued)

OTHER PUBLICATIONS

USPTO; Office Action dated Sep. 22, 2011 in U.S. Appl. No. 11/766,617.

(Continued)

*Primary Examiner* — Scott Kastler
(74) *Attorney, Agent, or Firm* — Snell & Wilmer L.L.P.

(57) ABSTRACT

Disclosed are degassers, couplings, impeller shafts and impellers for use in molten metal. One such coupling transfers gas into an impeller shaft, the coupling having a smooth, tapered internal surface to align with a corresponding surface on the impeller shaft and help prevent gas leakage and to assist in preventing damage to the impeller shaft. Improved impellers for shearing and mixing gas are also disclosed, as is a degasser including one or more of these components.

17 Claims, 12 Drawing Sheets

(56) References Cited

U.S. PATENT DOCUMENTS

| | | |
|---|---|---|
| 1,331,997 A | 2/1920 | Neal |
| 1,377,101 A | 5/1921 | Sparling |
| 1,380,798 A | 6/1921 | Hansen et al. |
| 1,439,365 A | 12/1922 | Hazell |
| 1,454,967 A | 5/1923 | Gill |
| 1,470,607 A | 10/1923 | Hazell |
| 1,513,875 A | 11/1924 | Wilke |
| 1,518,501 A | 12/1924 | Gill |
| 1,522,765 A | 1/1925 | Wilke |
| 1,526,851 A | 2/1925 | Hall |
| 1,669,668 A | 5/1928 | Marshall |
| 1,673,594 A | 6/1928 | Schmidt |
| 1,697,202 A | 1/1929 | Nagle |
| 1,717,969 A | 6/1929 | Goodner |
| 1,718,396 A | 6/1929 | Wheeler |
| 1,896,201 A | 2/1933 | Sterner-Rainer |
| 1,988,875 A | 1/1935 | Saborio |
| 2,013,455 A | 9/1935 | Baxter |
| 2,038,221 A | 4/1936 | Kagi |
| 2,090,162 A | 8/1937 | Tighe |
| 2,091,677 A | 8/1937 | Fredericks |
| 2,138,814 A | 12/1938 | Bressler |
| 2,173,377 A | 9/1939 | Schultz, Jr. et al. |
| 2,264,740 A | 12/1941 | Brown |
| 2,280,979 A | 4/1942 | Rocke |
| 2,290,961 A | 7/1942 | Heuer |
| 2,300,688 A | 11/1942 | Nagle |
| 2,304,849 A | 12/1942 | Ruthman |
| 2,368,962 A | 2/1945 | Blom |
| 2,383,424 A | 8/1945 | Stepanoff |
| 2,423,655 A | 7/1947 | Mars et al. |
| 2,488,447 A | 11/1949 | Tangen et al. |
| 2,493,467 A | 1/1950 | Sunnen |
| 2,515,097 A | 7/1950 | Schryber |
| 2,515,478 A | 7/1950 | Tooley ct al. |
| 2,528,208 A | 10/1950 | Bonsack et al. |
| 2,528,210 A | 10/1950 | Stewart |
| 2,543,633 A | 2/1951 | Lamphere |
| 2,566,892 A | 9/1951 | Jacobs |
| 2,625,720 A | 1/1953 | Ross |
| 2,626,086 A | 1/1953 | Forrest |
| 2,676,279 A | 4/1954 | Wilson |
| 2,677,609 A | 5/1954 | Moore et al. |
| 2,698,583 A | 1/1955 | House et al. |
| 2,714,354 A | 8/1955 | Farrand |
| 2,762,095 A | 9/1956 | Pemetzrieder |
| 2,768,587 A | 10/1956 | Corneil |
| 2,775,348 A | 12/1956 | Williams |
| 2,779,574 A | 1/1957 | Schneider |
| 2,787,873 A | 4/1957 | Hadley |
| 2,808,782 A | 10/1957 | Thompson et al. |
| 2,809,107 A | 10/1957 | Russell |
| 2,821,472 A | 1/1958 | Peterson et al. |
| 2,824,520 A | 2/1958 | Bartels |
| 2,832,292 A | 4/1958 | Edwards |
| 2,853,019 A | 9/1958 | Thorton |
| 2,865,618 A | 12/1958 | Abell |
| 2,901,677 A | 8/1959 | Chessman et al. |
| 2,906,632 A | 9/1959 | Nickerson |
| 2,918,876 A | 12/1959 | Howe |
| 2,948,524 A | 8/1960 | Sweeney et al. |
| 2,958,293 A | 11/1960 | Pray, Jr. |
| 2,978,885 A | 4/1961 | Davison |
| 2,984,524 A | 5/1961 | Franzen |
| 2,987,885 A | 6/1961 | Hodge |
| 3,010,402 A | 11/1961 | King |
| 3,015,190 A | 1/1962 | Arbeit |
| 3,039,864 A | 6/1962 | Hess |
| 3,044,408 A | 7/1962 | Mellott |
| 3,048,384 A | 8/1962 | Sweeney et al. |
| 3,070,393 A | 12/1962 | Silverberg et al. |
| 3,092,030 A | 6/1963 | Wunder |
| 3,099,870 A | 8/1963 | Seeler |
| 3,130,678 A | 4/1964 | Chenault |
| 3,130,679 A | 4/1964 | Sence |
| 3,171,357 A | 3/1965 | Egger |
| 3,203,182 A | 8/1965 | Pohl |
| 3,227,547 A | 1/1966 | Szekely |
| 3,244,109 A | 4/1966 | Barske |
| 3,251,676 A | 5/1966 | Johnson |
| 3,255,702 A | 6/1966 | Gehrm |
| 3,258,283 A | 6/1966 | Winberg et al. |
| 3,272,619 A | 9/1966 | Sweeney et al. |
| 3,289,473 A | 12/1966 | Louda |
| 3,289,743 A | 12/1966 | Louda |
| 3,291,473 A | 12/1966 | Sweeney et al. |
| 3,374,943 A | 3/1968 | Cervenka |
| 3,400,923 A | 9/1968 | Howie et al. |
| 3,417,929 A | 12/1968 | Secrest et al. |
| 3,432,336 A | 3/1969 | Langrod |
| 3,459,133 A | 8/1969 | Scheffler |
| 3,459,346 A | 8/1969 | Tinnes |
| 3,477,383 A | 11/1969 | Rawson et al. |
| 3,487,805 A | 1/1970 | Satterthwaite |
| 1,185,314 A | 3/1970 | London |
| 3,512,762 A | 5/1970 | Umbricht |
| 3,512,788 A | 5/1970 | Kilbane |
| 3,561,885 A | 2/1971 | Lake |
| 3,575,525 A | 4/1971 | Fox et al. |
| 3,618,917 A | 11/1971 | Fredrikson |
| 3,620,716 A | 11/1971 | Hess |
| 3,650,730 A | 3/1972 | Derham et al. |
| 3,689,048 A | 9/1972 | Foulard et al. |
| 3,715,112 A | 2/1973 | Carbonnel |
| 3,732,032 A | 5/1973 | Daneel |
| 3,737,304 A | 6/1973 | Blayden |
| 3,737,305 A | 6/1973 | Blayden |
| 3,743,263 A | 7/1973 | Szekely |
| 3,743,500 A | 7/1973 | Foulard ct al. |
| 3,753,690 A | 8/1973 | Emley et al. |
| 3,759,628 A | 9/1973 | Kempf |
| 3,759,635 A | 9/1973 | Carter et al. |
| 3,767,382 A | 10/1973 | Bruno et al. |
| 3,776,660 A | 12/1973 | Anderson et al. |
| 3,785,632 A | 1/1974 | Kraemer et al. |
| 3,787,143 A | 1/1974 | Carbonnel et al. |
| 3,799,522 A | 3/1974 | Brant et al. |
| 3,799,523 A | 3/1974 | Seki |
| 3,807,708 A | 4/1974 | Jones |
| 3,814,400 A | 6/1974 | Seki |
| 3,824,028 A | 7/1974 | Zenkner et al. |
| 3,824,042 A | 7/1974 | Barnes et al. |
| 3,836,280 A | 9/1974 | Koch |
| 3,839,019 A | 10/1974 | Bruno et al. |
| 3,844,972 A | 10/1974 | Tully, Jr. et al. |
| 3,871,872 A | 3/1975 | Downing et al. |
| 3,873,073 A | 3/1975 | Baum et al. |
| 3,873,305 A | 3/1975 | Claxton et al. |
| 3,881,039 A | 4/1975 | Baldieri et al. |
| 3,886,992 A | 6/1975 | Maas et al. |
| 3,915,594 A | 10/1975 | Nesseth |
| 3,915,694 A | 10/1975 | Ando |
| 3,941,588 A | 3/1976 | Dremann |
| 3,941,589 A | 3/1976 | Norman et al. |
| 3,954,134 A | 5/1976 | Maas et al. |
| 3,958,979 A | 5/1976 | Valdo |
| 3,958,981 A | 5/1976 | Forberg et al. |
| 3,961,778 A | 6/1976 | Carbonnel et al. |
| 3,966,456 A | 6/1976 | Ellenbaum et al. |
| 3,967,286 A | 6/1976 | Andersson et al. |
| 3,972,709 A | 8/1976 | Chin et al. |
| 3,984,234 A | 10/1976 | Claxton et al. |
| 3,985,000 A | 10/1976 | Hartz |
| 3,997,336 A | 12/1976 | van Linden et al. |
| 4,003,560 A | 1/1977 | Carbonnel |
| 4,008,884 A | 2/1977 | Fitzpatrick et al. |
| 4,018,598 A | 4/1977 | Markus |
| 4,052,199 A | 10/1977 | Mangalick |
| 4,055,390 A | 10/1977 | Young |
| 4,063,849 A | 12/1977 | Modianos |
| 4,068,965 A | 1/1978 | Lichti |
| 4,091,970 A | 5/1978 | Kimiyama et al. |
| 4,119,141 A | 10/1978 | Thut et al. |
| 4,126,360 A | 11/1978 | Miller et al. |

| | | |
|---|---|---|
| 4,128,415 A | 12/1978 | van Linden et al. |
| 4,169,584 A | 10/1979 | Mangalick |
| 4,191,486 A | 3/1980 | Pelton |
| 4,213,742 A | 7/1980 | Henshaw |
| 4,242,039 A | 12/1980 | Villard et al. |
| 4,244,423 A | 1/1981 | Thut et al. |
| 4,286,985 A | 9/1981 | van Linden et al. |
| 4,305,214 A | 12/1981 | Hurst |
| 4,322,245 A | 3/1982 | Claxton |
| 4,338,062 A | 7/1982 | Neal |
| 4,347,041 A | 8/1982 | Cooper |
| 4,351,514 A | 9/1982 | Koch |
| 4,355,789 A | 10/1982 | Dolzhenkov et al. |
| 4,360,314 A | 11/1982 | Pennell |
| 4,370,096 A | 1/1983 | Church |
| 4,372,541 A | 2/1983 | Bocourt et al. |
| 4,375,937 A | 3/1983 | Cooper |
| 4,389,159 A | 6/1983 | Sarvanne |
| 4,392,888 A | 7/1983 | Eckert et al. |
| 4,410,299 A | 10/1983 | Shimoyama |
| 4,419,049 A | 12/1983 | Gerboth et al. |
| 4,456,424 A | 6/1984 | Araoka |
| 4,470,846 A | 9/1984 | Dube |
| 4,474,315 A | 10/1984 | Gilbert et al. |
| 4,496,393 A | 1/1985 | Lustenberger |
| 4,504,392 A | 3/1985 | Groteke |
| 4,537,624 A | 8/1985 | Tenhover et al. |
| 4,537,625 A | 8/1985 | Tenhover et al. |
| 4,556,419 A | 12/1985 | Otsuka et al. |
| 4,557,766 A | 12/1985 | Tenhover et al. |
| 4,586,845 A | 5/1986 | Morris |
| 4,592,700 A | 6/1986 | Toguchi et al. |
| 4,594,052 A | 6/1986 | Niskanen |
| 4,598,899 A | 7/1986 | Cooper |
| 4,600,222 A | 7/1986 | Appling |
| 4,607,825 A | 8/1986 | Briolle et al. |
| 4,609,442 A | 9/1986 | Tenhover et al. |
| 4,611,790 A | 9/1986 | Otsuka et al. |
| 4,617,232 A | 10/1986 | Chandler et al. |
| 4,634,105 A | 1/1987 | Withers et al. |
| 4,640,666 A | 2/1987 | Sodergard |
| 4,655,610 A | 4/1987 | Al-Jaroudi |
| 4,684,281 A | 8/1987 | Patterson |
| 4,685,822 A | 8/1987 | Pelton |
| 4,696,703 A | 9/1987 | Henderson et al. |
| 4,701,226 A | 10/1987 | Henderson et al. |
| 4,702,768 A | 10/1987 | Areaux et al. |
| 4,714,371 A | 12/1987 | Cuse |
| 4,717,540 A | 1/1988 | McRae et al. |
| 4,739,974 A | 4/1988 | Mordue |
| 4,743,428 A | 5/1988 | McRae et al. |
| 4,747,583 A | 5/1988 | Gordon et al. |
| 4,767,230 A | 8/1988 | Leas, Jr. |
| 4,770,701 A | 9/1988 | Henderson et al. |
| 4,786,230 A | 11/1988 | Thut |
| 4,802,656 A | 2/1989 | Hudault et al. |
| 4,804,168 A | 2/1989 | Otsuka et al. |
| 4,810,314 A | 3/1989 | Henderson et al. |
| 4,834,573 A | 5/1989 | Asano et al. |
| 4,842,227 A | 6/1989 | Harrington et al. |
| 4,844,425 A | 7/1989 | Piras et al. |
| 4,851,296 A | 7/1989 | Tenhover et al. |
| 4,859,413 A | 8/1989 | Harris et al. |
| 4,867,638 A | 9/1989 | Handtmann et al. |
| 4,884,786 A | 12/1989 | Gillespie |
| 4,898,367 A | 2/1990 | Cooper |
| 4,908,060 A | 3/1990 | Duenkelmann |
| 4,923,770 A | 5/1990 | Grasselli et al. |
| 4,930,986 A | 6/1990 | Cooper |
| 4,931,091 A | 6/1990 | Waite et al. |
| 4,940,214 A | 7/1990 | Gillespie |
| 4,940,384 A | 7/1990 | Amra et al. |
| 4,954,167 A | 9/1990 | Cooper |
| 4,973,433 A | 11/1990 | Gilbert et al. |
| 4,986,736 A | 1/1991 | Kajiwara |
| 4,989,736 A | 2/1991 | Andersson et al. |
| 5,015,518 A | 5/1991 | Sasaki et al. |
| 5,025,198 A | 6/1991 | Mordue et al. |
| 5,028,211 A | 7/1991 | Mordue et al. |
| 5,029,821 A | 7/1991 | Bar-on et al. |
| 5,078,572 A | 1/1992 | Amra et al. |
| 5,080,715 A | 1/1992 | Provencher et al. |
| 5,088,893 A | 2/1992 | Gilbert et al. |
| 5,092,821 A | 3/1992 | Gilbert et al. |
| 5,098,134 A | 3/1992 | Monckton |
| 5,114,312 A | 5/1992 | Stanislao |
| 5,126,047 A | 6/1992 | Martin et al. |
| 5,131,632 A | 7/1992 | Olson |
| 5,143,357 A | 9/1992 | Gilbert et al. |
| 5,145,322 A | 9/1992 | Senior, Jr. et al. |
| 5,152,631 A | 10/1992 | Bauer |
| 5,154,652 A | 10/1992 | Ecklesdafer |
| 5,158,440 A | 10/1992 | Cooper et al. |
| 5,162,858 A | 11/1992 | Shoji et al. |
| 5,165,858 A | 11/1992 | Gilbert et al. |
| 5,177,304 A | 1/1993 | Nagel |
| 5,191,154 A | 3/1993 | Nagel |
| 5,192,193 A | 3/1993 | Cooper et al. |
| 5,202,100 A | 4/1993 | Nagel et al. |
| 5,203,681 A | 4/1993 | Cooper |
| 5,209,641 A | 5/1993 | Hoglund et al. |
| 5,215,448 A | 6/1993 | Cooper |
| 5,268,020 A | 12/1993 | Claxton |
| 5,286,163 A | 2/1994 | Amra et al. |
| 5,298,233 A | 3/1994 | Nagel |
| 5,301,620 A | 4/1994 | Nagel et al. |
| 5,308,045 A | 5/1994 | Cooper |
| 5,310,412 A | 5/1994 | Gilbert et al. |
| 5,318,360 A | 6/1994 | Langer et al. |
| 5,322,547 A | 6/1994 | Nagel et al. |
| 5,324,341 A | 6/1994 | Nagel et al. |
| 5,330,328 A | 7/1994 | Cooper |
| 5,354,940 A | 10/1994 | Nagel |
| 5,358,549 A | 10/1994 | Nagel et al. |
| 5,358,697 A | 10/1994 | Nagel |
| 5,364,078 A | 11/1994 | Pelton |
| 5,369,063 A | 11/1994 | Gee et al. |
| 5,388,633 A | 2/1995 | Mercer, II et al. |
| 5,395,405 A | 3/1995 | Nagel et al. |
| 5,399,074 A | 3/1995 | Nose et al. |
| 5,407,294 A | 4/1995 | Giannini |
| 5,411,240 A | 5/1995 | Rapp et al. |
| 5,425,410 A | 6/1995 | Reynolds |
| 5,431,551 A | 7/1995 | Aquino et al. |
| 5,435,982 A | 7/1995 | Wilkinson |
| 5,436,210 A | 7/1995 | Wilkinson et al. |
| 5,443,572 A | 8/1995 | Wilkinson et al. |
| 5,454,423 A | 10/1995 | Tsuchida et al. |
| 5,468,280 A | 11/1995 | Areaux |
| 5,470,201 A | 11/1995 | Gilbert et al. |
| 5,484,265 A | 1/1996 | Horvath et al. |
| 5,489,734 A | 2/1996 | Nagel et al. |
| 5,491,279 A | 2/1996 | Robert et al. |
| 5,495,746 A | 3/1996 | Sigworth |
| 5,505,143 A | 4/1996 | Nagel |
| 5,509,791 A | 4/1996 | Turner |
| 5,537,940 A | 7/1996 | Nagel et al. |
| 5,543,558 A | 8/1996 | Nagel et al. |
| 5,555,822 A | 9/1996 | Loewen et al. |
| 5,558,501 A | 9/1996 | Wang et al. |
| 5,558,505 A | 9/1996 | Mordue et al. |
| 5,571,486 A | 11/1996 | Robert et al. |
| 5,585,532 A | 12/1996 | Nagel |
| 5,586,863 A | 12/1996 | Gilbert et al. |
| 5,591,243 A | 1/1997 | Colussi et al. |
| 5,597,289 A | 1/1997 | Thut |
| 5,613,245 A | 3/1997 | Robert |
| 5,616,167 A | 4/1997 | Eckert |
| 5,622,481 A | 4/1997 | Thut |
| 5,629,464 A | 5/1997 | Bach et al. |
| 5,634,770 A | 6/1997 | Gilbert et al. |
| 5,640,706 A | 6/1997 | Nagel et al. |
| 5,640,707 A | 6/1997 | Nagel et al. |
| 5,640,709 A | 6/1997 | Nagel et al. |
| 5,655,849 A | 8/1997 | McEwen et al. |
| 5,660,614 A * | 8/1997 | Waite et al. .............. 75/680 |
| 5,662,725 A | 9/1997 | Cooper |
| 5,676,520 A | 10/1997 | Thut |

| | | |
|---|---|---|
| 5,678,244 A | 10/1997 | Shaw et al. |
| 5,678,807 A * | 10/1997 | Cooper .................. 266/216 |
| 5,679,132 A | 10/1997 | Rauenzahn et al. |
| 5,685,701 A | 11/1997 | Chandler et al. |
| 5,690,888 A | 11/1997 | Robert |
| 5,695,732 A | 12/1997 | Sparks et al. |
| 5,716,195 A | 2/1998 | Thut |
| 5,717,149 A | 2/1998 | Nagel et al. |
| 5,718,416 A | 2/1998 | Flisakowski et al. |
| 5,735,668 A | 4/1998 | Klein |
| 5,735,935 A | 4/1998 | Areaux |
| 5,741,422 A | 4/1998 | Eichenmiller et al. |
| 5,744,117 A | 4/1998 | Wilkinson et al. |
| 5,745,861 A | 4/1998 | Bell et al. |
| 5,772,324 A | 6/1998 | Falk |
| 5,776,420 A | 7/1998 | Nagel |
| 5,785,494 A | 7/1998 | Vild et al. |
| 5,842,832 A | 12/1998 | Thut |
| 5,858,059 A | 1/1999 | Abramovich et al. |
| 5,863,314 A | 1/1999 | Morando |
| 5,866,095 A | 2/1999 | McGeever et al. |
| 5,875,385 A | 2/1999 | Stephenson et al. |
| 5,935,528 A | 8/1999 | Stephenson et al. |
| 5,944,496 A | 8/1999 | Cooper |
| 5,947,705 A | 9/1999 | Mordue et al. |
| 5,951,243 A | 9/1999 | Cooper |
| 5,961,285 A | 10/1999 | Meneice et al. |
| 5,963,580 A | 10/1999 | Eckert |
| 5,992,230 A | 11/1999 | Scarpa et al. |
| 5,993,726 A | 11/1999 | Huang et al. |
| 5,993,728 A | 11/1999 | Vild |
| 6,019,576 A | 2/2000 | Thut |
| 6,027,685 A | 2/2000 | Cooper |
| 6,036,745 A | 3/2000 | Gilbert et al. |
| 6,074,455 A | 6/2000 | van Linden et al. |
| 6,082,965 A | 7/2000 | Morando |
| 6,093,000 A | 7/2000 | Cooper |
| 6,096,109 A | 8/2000 | Nagel et al. |
| 6,113,154 A | 9/2000 | Thut |
| 6,123,523 A | 9/2000 | Cooper |
| 6,152,691 A | 11/2000 | Thut |
| 6,168,753 B1 | 1/2001 | Morando |
| 6,187,096 B1 | 2/2001 | Thut |
| 6,199,836 B1 | 3/2001 | Rexford et al. |
| 6,217,823 B1 | 4/2001 | Vild et al. |
| 6,231,639 B1 | 5/2001 | Eichenmiller et al. |
| 6,250,881 B1 | 6/2001 | Mordue et al. |
| 6,254,340 B1 | 7/2001 | Vild et al. |
| 6,270,717 B1 | 8/2001 | Tremblay et al. |
| 6,280,157 B1 | 8/2001 | Cooper |
| 6,293,759 B1 | 9/2001 | Thut |
| 6,303,074 B1 | 10/2001 | Cooper |
| 6,345,964 B1 | 2/2002 | Cooper |
| 6,354,796 B1 | 3/2002 | Morando |
| 6,358,467 B1 | 3/2002 | Mordue |
| 6,371,723 B1 | 4/2002 | Grant et al. |
| 6,398,525 B1 | 6/2002 | Cooper |
| 6,439,860 B1 | 8/2002 | Greer |
| 6,451,247 B1 | 9/2002 | Mordue et al. |
| 6,457,940 B1 | 10/2002 | Lehman |
| 6,457,950 B1 | 10/2002 | Cooper et al. |
| 6,464,458 B2 | 10/2002 | Vild et al. |
| 6,497,559 B1 | 12/2002 | Grant |
| 6,500,228 B1 | 12/2002 | Klingensmith et al. |
| 6,503,292 B2 | 1/2003 | Klingensmith et al. |
| 6,524,066 B2 | 2/2003 | Thut |
| 6,533,535 B2 | 3/2003 | Thut |
| 6,551,060 B2 | 4/2003 | Mordue et al. |
| 6,562,286 B1 | 5/2003 | Lehman |
| 6,679,936 B2 | 1/2004 | Quackenbush |
| 6,689,310 B1 * | 2/2004 | Cooper .................. 266/235 |
| 6,709,234 B2 | 3/2004 | Gilbert et al. |
| 6,723,276 B1 | 4/2004 | Cooper |
| 6,805,834 B2 | 10/2004 | Thut |
| 6,843,640 B2 | 1/2005 | Mordue et al. |
| 6,848,497 B2 | 2/2005 | Sale et al. |
| 6,869,271 B2 | 3/2005 | Gilbert et al. |
| 6,869,564 B2 | 3/2005 | Gilbert et al. |
| 6,881,030 B2 | 4/2005 | Thut |
| 6,887,424 B2 | 5/2005 | Ohno et al. |
| 6,887,425 B2 | 5/2005 | Mordue et al. |
| 6,902,696 B2 | 6/2005 | Klingensmith et al. |
| 7,083,758 B2 | 8/2006 | Tremblay |
| 7,131,482 B2 | 11/2006 | Vincent et al. |
| 7,157,043 B2 | 1/2007 | Neff |
| 7,279,128 B2 | 10/2007 | Kennedy et al. |
| 7,326,028 B2 | 2/2008 | Morando |
| 7,402,276 B2 | 7/2008 | Cooper |
| 7,470,392 B2 | 12/2008 | Cooper |
| 7,476,357 B2 | 1/2009 | Thut |
| 7,497,988 B2 | 3/2009 | Thut |
| 7,507,367 B2 | 3/2009 | Cooper |
| 8,110,141 B2 | 2/2012 | Cooper |
| 2001/0000465 A1 | 4/2001 | Thut |
| 2002/0185794 A1 | 12/2002 | Vincent |
| 2003/0047850 A1 | 3/2003 | Areaux |
| 2003/0201583 A1 | 10/2003 | Klingensmith et al. |
| 2004/0050525 A1 | 3/2004 | Kennedy et al. |
| 2004/0076533 A1 | 4/2004 | Cooper |
| 2004/0115079 A1 | 6/2004 | Cooper |
| 2004/0262825 A1 | 12/2004 | Cooper |
| 2005/0013713 A1 | 1/2005 | Cooper |
| 2005/0013714 A1 | 1/2005 | Cooper |
| 2005/0013715 A1 | 1/2005 | Cooper |
| 2005/0053499 A1 | 3/2005 | Cooper |
| 2005/0077730 A1 | 4/2005 | Thut |
| 2005/0116398 A1 | 6/2005 | Tremblay |
| 2006/0180963 A1 | 8/2006 | Thut |
| 2007/0253807 A1 | 11/2007 | Cooper |
| 2008/0213111 A1 | 9/2008 | Cooper |
| 2008/0230966 A1 | 9/2008 | Cooper |
| 2011/0140319 A1 | 6/2011 | Cooper |

FOREIGN PATENT DOCUMENTS

| | | |
|---|---|---|
| CA | 2176475 | 5/1996 |
| CA | 2244251 | 12/1996 |
| CA | 2305865 | 2/2000 |
| CH | 392268 | 9/1965 |
| DE | 1800446 | 12/1969 |
| EP | 0168250 | 1/1986 |
| EP | 0665378 | 2/1995 |
| EP | 1019635 | 6/2006 |
| GB | 942648 | 11/1963 |
| GB | 1185314 | 3/1970 |
| GB | 2217784 | 3/1989 |
| JP | 58048796 | 3/1983 |
| JP | 63104773 | 5/1988 |
| MX | 227385 | 4/2005 |
| NO | 90756 | 1/1959 |
| SU | 416401 | 2/1974 |
| SU | 773312 | 10/1980 |
| WO | 9808990 | 3/1998 |
| WO | 9825031 | 11/1998 |
| WO | 0009889 | 2/2000 |
| WO | 0212147 | 2/2002 |

OTHER PUBLICATIONS

USPTO; Notice of Allowance dated Nov. 1, 2011 in U.S. Appl. No. 12/146,770.

USPTO; Office Action dated Nov. 4, 2011 in U.S. Appl. No. 12/264,416.

USPTO; Office Action dated Sep. 22, 2011 in U.S. Appl. No. 12/880,027.

USPTO; Office Action dated Jan. 27, 2012 in U.S. Appl. No. 11/766,617.

USPTO; Notice of Allowance dated May 15, 2012 in U.S. Appl. No. 11/766,617.

USPTO; Final Office Action dated Nov. 28, 2011 in U.S. Appl. No. 12/120,190.

USPTO; Notice of Allowance dated Feb. 6, 2012 in U.S. Appl. No. 12/120,190.

USPTO; Final Office Action dated Feb. 3, 2012 in U.S. Appl. No. 12/120,200.

USPTO; Final Office Action dated Jun. 8, 2012 in U.S. Appl. No. 12/264,416.

USPTO; Final Office Action dated Dec. 13, 2011 in U.S. Appl. No. 12/395,430.
USPTO; Advisory Action dated Feb. 22, 2012 in U.S. Appl. No. 12/395,430.
USPTO; Office Action dated Feb. 1, 2012 in U.S. Appl. No. 12/853,201.
USPTO; Final Office Action dated Jul. 3, 2012 in U.S. Appl. No. 12/853,201.
USPTO; Office Action dated Feb. 27, 2012 in U.S. Appl. No. 12/853,253.
USPTO; Ex Parte Quayle Action dated Jun. 27, 2012 in U.S. Appl. No. 12/853,253.
USPTO; Office Action dated Mar. 12, 2012 in U.S. Appl. No. 12/853,255.
USPTO; Office Action dated Apr. 19, 2012 in U.S. Appl. No. 12/853,268.
USPTO; Final Office Action dated Sep. 17, 2012 in U.S. Appl. No. 12/853,268.
USPTO; Final Office Action dated Feb. 16, 2012 in U.S. Appl. No. 12/880,027.
USPTO; Final Office Action dated Dec. 16, 2011 in U.S. Appl. No. 13/047,719.
USPTO; Office Action dated Sep. 11, 2012 in U.S. Appl. No. 13/047,719.
USPTO; Final Office Action dated Feb. 7, 2012 in U.S. Appl. No. 13/047,747.
USPTO; Notice of Allowance dated Apr. 18, 2012 in U.S. Appl. No. 13/047,747.
USPTO; Office Action dated Apr. 18, 2012 in U.S. Appl. No. 13/252,145.
USPTO; Final Office Action dated Sep. 17, 2012 in U.S. Appl. No. 13/252,145.
CIPO; Notice of Allowance dated Jan. 15, 2008 in Application No. 2,244,251.
USPTO; Supplemental Notice of Allowance dated Jul. 31, 2012 in U.S. Appl. No. 11/766,617.
USPTO; Notice of Allowance dated Aug. 24, 2012 in U.S. Appl. No. 11/766,617.
USPTO; Final Office Action dated Jul. 24, 2012 in U.S. Appl. No. 12/853,255.
"Response to Final Office Action and Request for Continued Examination for U.S. Appl. No. 09/275,627," Including Declarations of Haynes and Johnson, Apr. 16, 2001.
Document No. 504217: Excerpts from "Pyrotek Inc.'s Motion for Summary Judgment of Invalidity and Unenforceability of U.S. Patent No. 7,402,276," Oct. 2, 2009.
Document No. 505026: Excerpts from "MMEI's Response to Pyrotek's Motion for Summary Judgment of Invalidity or Enforceability of U.S. Patent No. 7,402,276," Oct. 9, 2009.
Document No. 507689: Excerpts from "MMEI's Pre-Hearing Brief and Supplemental Motion for Summary Judgment of Infringement of Claims 3-4, 15, 17-20, 26 and 28-29 of the '074 Patent and Motion for Reconsideration of the Validity of Claims 7-9 of the '276 Patent," Nov. 4, 2009.
Document No. 517158: Excerpts from "Reasoned Award," Feb. 19, 2010.
Document No. 525055: Excerpts from "Molten Metal Equipment Innovations, Inc.'s Reply Brief in Support of Application to Confirm Arbitration Award and Opposition to Motion to Vacate," May 12, 2010.
USPTO; Office Action dated Feb. 23, 1996 in U.S. Appl. No. 08/439,739.
USPTO; Office Action dated Aug. 15, 1996 in U.S. Appl. No. 08/439,739.
USPTO; Advisory Action dated Nov. 18, 1996 in U.S. Appl. No. 08/439,739.
USPTO; Advisory Action dated Dec. 9, 1996 in U.S. Appl. No. 08/439,739.
USPTO; Notice of Allowance dated Jan. 17, 1997 in U.S. Appl. No. 08/439,739.
USPTO; Office Action dated Jul. 22, 1996 in U.S. Appl. No. 08/489,962.
USPTO; Office Action dated Jan. 6, 1997 in U.S. Appl. No. 08/489,962.
USPTO; Interview Summary dated Mar. 4, 1997 in U.S. Appl. No. 08/489,962.
USPTO; Notice of Allowance dated Mar. 27, 1997 in U.S. Appl. No. 08/489,962.
USPTO; Office Action dated Sep. 23, 1998 in U.S. Appl. No. 08/759,780.
USPTO; Interview Summary dated Dec. 30, 1998 in U.S. Appl. No. 08/789,780.
USPTO; Notice of Allowance dated Mar. 17, 1999 in U.S. Appl. No. 08/789,780.
USPTO; Office Action dated Jul. 23, 1998 in U.S. Appl. No. 08/889,882.
USPTO; Office Action dated Jan. 21, 1999 in U.S. Appl. No. 08/889,882.
USPTO; Notice of Allowance dated Mar. 17, 1999 in U.S. Appl. No. 08/889,882.
USPTO; Office Action dated Feb. 26, 1999 in U.S. Appl. No. 08/951,007.
USPTO; Interview Summary dated Mar. 15, 1999 in U.S. Appl. No. 08/951,007.
USPTO; Office Action dated May 17, 1999 in U.S. Appl. No. 08/951,007.
USPTO; Notice of Allowance dated Aug. 27, 1999 in U.S. Appl. No. 08/951,007.
USPTO; Office Action dated Dec. 23, 1999 in U.S. Appl. No. 09/132,934.
USPTO; Notice of Allowance dated Mar. 9, 2000 in U.S. Appl. No. 09/132,934.
USPTO; Office Action dated Jan. 7, 2000 in U.S. Appl. No. 09/152,168.
USPTO; Notice of Allowance dated Aug. 7, 2000 in U.S. Appl. No. 09/152,168.
USPTO; Office Action dated Sep. 14, 1999 in U.S. Appl. No. 09/275,627.
USPTO; Office Action dated May 22, 2000 in U.S. Appl. No. 09/275,627.
USPTO; Office Action dated Nov. 14, 2000 in U.S. Appl. No. 09/275,627.
USPTO; Office Action dated May 21, 2001 in U.S. Appl. No. 09/275,627.
USPTO; Notice of Allowance dated Aug. 31, 2001 in U.S. Appl. No. 09/275,627.
USPTO; Office Action dated Jun. 15, 2000 in U.S. Appl. No. 09/312,361.
USPTO; Notice of Allowance dated Jan. 29, 2001 in U.S. Appl. No. 09/312,361.
USPTO; Office Action dated Jun. 22, 2001 in U.S. Appl. No. 09/569,461.
USPTO; Office Action dated Oct. 12, 2001 in U.S. Appl. No. 09/569,461.
USPTO; Office Action dated May 3, 2002 in U.S. Appl. No. 09/569,461.
USPTO; Advisory Action dated May 14, 2002 in U.S. Appl. No. 09/569,461.
USPTO; Office Action dated Dec. 4, 2002 in U.S. Appl. No. 09/569,461.
USPTO; Interview Summary dated Jan. 14, 2003 in U.S. Appl. No. 09/569,461.
USPTO; Notice of Allowance dated Jun. 24, 2003 in U.S. Appl. No. 09/569,461.
USPTO; Office Action dated Nov. 21, 2000 in U.S. Appl. No. 09/590,108.
USPTO; Office Action dated May 22, 2001 in U.S. Appl. No. 09/590,108.
USPTO; Notice of Allowance dated Sep. 10, 2001 in U.S. Appl. No. 09/590,108.
USPTO; Office Action dated Jan. 30, 2002 in U.S. Appl. No. 09/649,190.
USPTO; Office Action dated Oct. 4, 2002 in U.S. Appl. No. 09/649,190.

USPTO; Office Action dated Apr. 18, 2003 in U.S. Appl. No. 09/649,190.
USPTO; Notice of Allowance dated Nov. 21, 2003 in U.S. Appl. No. 09/649,190.
USPTO; Office Action dated Jun. 7, 2006 in U.S. Appl. No. 10/619,405.
USPTO; Final Office Action dated Feb. 20, 2007 in U.S. Appl. No. 10/619,405.
USPTO; Office Action dated Oct. 9, 2007 in U.S. Appl. No. 10/619,405.
USPTO; Final Office Action dated May 29, 2008 in U.S. Appl. No. 10/619,405.
USPTO; Interview Summary Aug. 22, 2008 in U.S. Appl. No. 10/619,405.
USPTO; Ex Parte Quayle dated Sep. 12, 2008 in U.S. Appl. No. 10/619,405.
USPTO; Interview Summary dated Oct. 16, 2008 in U.S. Appl. No. 10/619,405.
USPTO; Notice of Allowance dated Nov. 14, 2008 in U.S. Appl. No. 10/619,405.
USPTO; Office Action dated Mar. 20, 2006 in U.S. Appl. No. 10/620,318.
USPTO; Office Action dated Nov. 16, 2006 in U.S. Appl. No. 10/620,318.
USPTO; Final Office Action dated Jul. 25, 2007 in U.S. Appl. No. 10/620,318.
USPTO; Office Action dated Feb. 12, 2008 in U.S. Appl. No. 10/620,318.
USPTO; Final Office Action dated Oct. 16, 2008 in U.S. Appl. No. 10/620,318.
USPTO; Office Action dated Feb. 25, 2009 in U.S. Appl. No. 10/620,318.
USPTO; Final Office Action dated Oct. 8, 2009 in U.S. Appl. No. 10/620,318.
USPTO; Notice of Allowance Jan. 26, 2010 in U.S. Appl. No. 10/620,318.
USPTO; Office Action dated Nov. 15, 2007 in U.S. Appl. No. 10/773,101.
USPTO; Office Action dated Jun. 27, 2006 in U.S. Appl. No. 10/773,102.
USPTO; Office Action dated Mar. 6, 2007 in U.S. Appl. No. 10/773,102.
USPTO; Office Action dated Oct. 11, 2007 in U.S. Appl. No. 10/773,102.
USPTO; Interview Summary dated Mar. 18, 2008 in U.S. Appl. No. 10/773,102.
USPTO; Notice of Allowance Apr., 18, 2008 in U.S. Appl. No. 10/773,102.
USPTO; Office Action dated Jul. 24, 2006 in U.S. Appl. No. 10/773,105.
USPTO; Final Office Action dated Jul. 21, 2007 in U.S. Appl. No. 10/773,105.
USPTO; Office Action dated Oct. 9, 2007 in U.S. Appl. No. 10/773,105.
USPTO; Interview Summary dated Jan. 25, 2008 in U.S. Appl. No. 10/773,105.
USPTO; Office Action dated May 19, 2008 in U.S. Appl. No. 10/773,105.
USPTO; Interview Summary dated Jul. 21, 2008 in U.S. Appl. No. 10/773,105.
USPTO; Notice of Allowance dated Sep. 29, 2008 in U.S. Appl. No. 10/773,105.
USPTO; Office Action dated Jan. 31, 2008 in U.S. Appl. No. 10/773,118.
USPTO; Final Office Action dated Aug. 18, 2008 in U.S. Appl. No. 10/773,118.
USPTO; Interview Summary dated Oct. 16, 2008 in U.S. Appl. No. 10/773,118.
USPTO; Office Action dated Dec. 15, 2008 in U.S. Appl. No. 10/773,118.
USPTO; Final Office Action dated May 1, 2009 in U.S. Appl. No. 10/773,118.
USPTO; Office Action dated Jul. 27, 2009 in U.S. Appl. No. 10/773,118.
USPTO; Final Office Action dated Feb. 2, 2010 in U.S. Appl. No. 10/773,118.
USPTO; Interview Summary dated Jun. 4, 2010 in U.S. Appl. No. 10/773,118.
USPTO; Ex Parte Quayle Action dated Aug. 25, 2010 in U.S. Appl. No. 10/773,118.
USPTO; Notice of Allowance dated Nov. 5, 2010 in U.S. Appl. No. 10/773,118.
USPTO; Office Action dated Mar. 16, 2005 in U.S. Appl. No. 10/827,941.
USPTO; Final Office Action dated Nov. 7, 2005 in U.S. Appl. No. 10/827,941.
USPTO; Office Action dated Jul. 12, 2006 in U.S. Appl. No. 10/827,941.
USPTO; Final Office Action dated Mar. 8, 2007 in U.S. Appl. No. 10/827,941.
USPTO; Office Action dated Oct. 29, 2007 in U.S. Appl. No. 10/827,941.
USPTO; Office Action dated Sep. 26, 2008 in U.S. Appl. No. 11/413,982.
USPTO; Final Office Action dated Oct. 14, 2008 in U.S. Appl. No. 12/111,835.
USPTO; Office Action dated May 15, 2009 in U.S. Appl. No. 12/111,835.
USPTO; Office Action dated Nov. 3, 2008 in U.S. Appl. No. 12/120,200.
USPTO; Final Office Action dated May 28, 2009 in U.S. Appl. No. 12/120,200.
USPTO; Office Action dated Dec. 18, 2009 in U.S. Appl. No. 12/120,200.
USPTO; Final Office Action dated Jul. 9, 2010 in U.S. Appl. No. 12/120,200.
USPTO; Office Action dated Jan. 21, 2011 in U.S. Appl. No. 12/120,200.
USPTO; Final Office Action dated Jul. 26, 2011 in U.S. Appl. No. 12/120,200.
USPTO; Office Action dated Mar. 31, 2009 in U.S. Appl. No. 12/120,190.
USPTO; Final Office Action dated Dec. 4, 2009 in U.S. Appl. No. 12/120,190.
USPTO; Office Action dated Jun. 28, 2010 in U.S. Appl. No. 12/120,190.
USPTO; Final Office Action dated Jan. 6, 2011 in U.S. Appl. No. 12/120,190.
USPTO; Office Action dated Jun. 27, 2011 in U.S. Appl. No. 12/120,190.
USPTO; Office Action dated Apr. 13, 2009 in U.S. Appl. No. 12/264,416.
USPTO; Final Office Action dated Oct. 8, 2009 in U.S. Appl. No. 12/264,416.
USPTO; Office Action dated Feb. 1, 2010 in U.S. Appl. No. 12/264,416.
USPTO; Final Office Action dated Jun. 30, 2010 in U.S. Appl. No. 12/264,416.
USPTO; Office Action dated Mar. 17, 2011 in U.S. Appl. No. 12/264,416.
USPTO; Final Office Action dated Jul. 7, 2011 in U.S. Appl. No. 12/264,416.
USPTO; Office Action dated Apr. 27, 2009 in U.S. Appl. No. 12/146,788.
USPTO; Final Office Action dated Oct. 15, 2009 in U.S. Appl. No. 12/146,788.
USPTO; Office Action dated Feb. 16, 2010 in U.S. Appl. No. 12/146,788.
USPTO; Final Office Action dated Jul. 13, 2010 in U.S. Appl. No. 12/146,788.
USPTO; Office Action dated Apr. 19, 2011 in U.S. Appl. No. 12/146,788.
USPTO; Notice of Allowance dated Aug. 19, 2011 in U.S. Appl. No. 12/146,788.

USPTO; Office Action dated May 22, 2009 in U.S. Appl. No. 12/369,362.
USPTO; Final Office Action dated Dec. 14, 2009 in U.S. Appl. No. 12/369,362.
USPTO; Office Action dated Jun. 16, 2009 in U.S. Appl. No. 12/146,770.
USPTO; Final Office Action dated Feb. 24, 2010 in U.S. Appl. No. 12/146,770.
USPTO; Office Action dated Jun. 9, 2010 in U.S. Appl. No. 12/146,770.
USPTO; Office Action dated Nov. 18, 2010 in U.S. Appl. No. 12/146,770.
USPTO; Final Office Action dated Apr. 4, 2011 in U.S. Appl. No. 12/146,770.
USPTO; Notice of Allowance dated Aug. 22, 2011 in U.S. Appl. No. 12/146,770.
USPTO; Office Action dated Dec. 11, 2009 in U.S. Appl. No. 11/766,617.
USPTO; Office Action dated Mar. 8, 2010 in U.S. Appl. No. 11/766,617.
USPTO; Final Office Action dated Sep. 20, 2010 in U.S. Appl. No. 11/766,617.
USPTO; Office Action dated Mar. 1, 2011 in U.S. Appl. No. 11/766,617.
USPTO; Final Office Action dated Jun. 11, 2010 in U.S. Appl. No. 12/395,430.
USPTO; Office Action dated Nov. 24, 2010 in U.S. Appl. No. 12/395,430.
USPTO; Final Office Action dated Apr. 6, 2011 in U.S. Appl. No. 12/395,430.
USPTO; Office Action dated Aug. 18, 2011 in U.S. Appl. No. 12/395,430.
USPTO; Office Action dated Sep. 29, 2010 in U.S. Appl. No. 12/758,509.
USPTO; Final Office Action dated May 11, 2011 in U.S. Appl. No. 12/758,509.
USPTO; Office Action dated Aug. 25, 2011 in U.S. Appl. No. 13/047,747.
USPTO; Office Action dated Aug. 25, 2011 in U.S. Appl. No. 13/047,719.
USPTO; Office Action dated Aug. 27, 2001 in U.S. Appl. No. 90/005,910.
CIPO; Office Action dated Dec. 4, 2001 in Application No. 2,115,929.
CIPO; Office Action dated Apr. 22, 2002 in Application No. 2,115,929.
CIPO; Notice of Allowance dated Jul. 18, 2003 in Application No. 2,115,929.
CIPO; Office Action dated Jun. 30, 2003 in Application No. 2,176,475.
CIPO; Notice of Allowance dated Sep. 15, 2004 in Application No. 2,176,475.
CIPO; Office Action dated May 29, 2000 in Application No. 2,242,174.
CIPO; Office Action dated Feb. 22, 2006 in Application No. 2,244,251.
CIPO; Office Action dated Mar. 27, 2007 in Application No. 2,244,251.
CIPO; Notice of Allowance dated Jan. 15, 200 in Application No. 2,244,251.
CIPO; Office Action dated Sep. 18, 2002 in Application No. 2,305,865.
CIPO; Notice of Allowance dated May 2, 2003 in Application No. 2,305,865.
EPO; Examination Report dated Oct. 6, 2008 in Application No. 08158682.
EPO; Office Action dated Jan. 26, 2010 in Application No. 08158682.
EPO; Office Action dated Feb. 15, 2011 in Application No. 08158682.
EPO; Search Report dated Nov. 9, 1998 in Application No. 98112356.
EPO; Office Action dated Feb. 6, 2003 in Application No. 99941032.
EPO; Office Action dated Aug. 20, 2004 in Application No. 99941032.
PCT; International Search Report or Declaration dated Nov. 15, 1999 in Application No. PCT/US1999/18178.
PCT; International Search Report or Declaration dated Oct. 9, 1998 in Application No. PCT/US1999/22440.

* cited by examiner

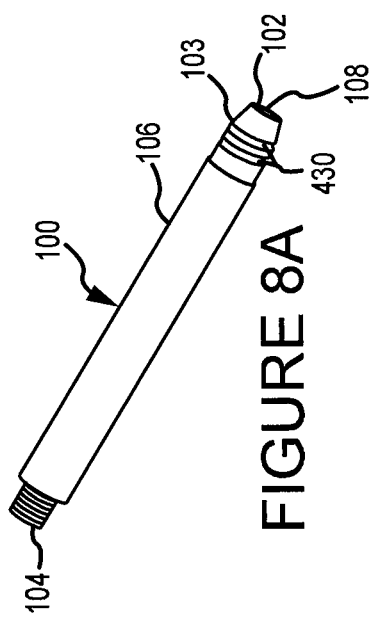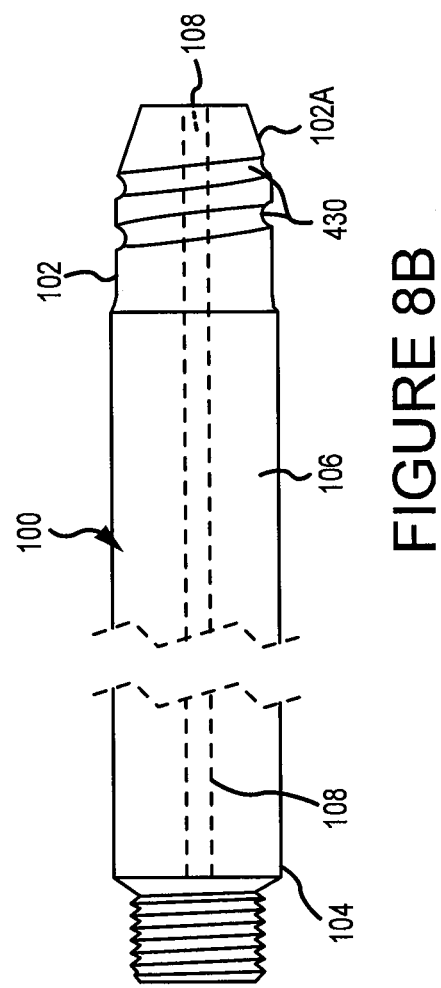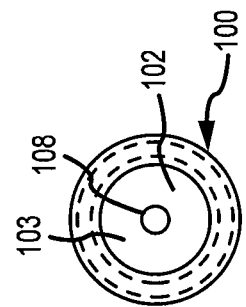

ROTARY DEGASSERS AND COMPONENTS THEREFOR

PRIORITY CLAIM

This application claims priority to U.S. Provisional Application No. 61/240,981, filed on Sep. 9, 2009, entitled "Impeller and Degasser Couplings for Molten Metal Devices," and invented by Paul V. Cooper. The drawings and pages 29-35 of that application are incorporated herein by reference. This application is a continuation in part of and claims priority to U.S. patent application Ser. No. 12/853,255, entitled "Rotary Degasser and Rotor Therefor," filed on Aug. 9, 2010 currently pending, and invented by Paul V. Cooper which claims priority to U.S. Provisional Patent Application No. 61/232,384 entitled "Rotary Degasser and Rotor Therefor," filed on Aug. 7, 2009." The disclosure of U.S. patent application Ser. No. 12/853,255 is incorporated herein by reference.

FIELD OF THE INVENTION

The invention relates to couplings, impellers and rotary degassers used in molten metal. One aspect of the invention is an impeller shaft for use with an impeller shaft that transfers gas, wherein the coupling decreases the possibility of impeller shaft breakage, gas leakage and maintenance. Another aspect of the invention is an improved impeller for introducing, and mixing gas with molten metal.

BACKGROUND OF THE INVENTION

As used herein, the term "molten metal" means any metal or combination of metals in liquid form, such as aluminum, copper, iron, zinc, and alloys thereof. The term "gas" means any gas or combination of gases, including argon, nitrogen, chlorine, fluorine, Freon, and helium, which may be released into molten metal.

A reverbatory furnace is used to melt metal and retain the molten metal while the metal is in a molten state. The molten metal in the furnace is sometimes called the molten metal bath. Reverbatory furnaces usually include a chamber for retaining a molten metal pump and that chamber is sometimes referred to as the pump well.

Known pumps for pumping molten metal (also called "molten-metal pumps") include a pump base (also called a "base", "housing" or "casing") and a pump chamber (or "chamber" or "molten metal pump chamber"), which is an open area formed within the pump base. Such pumps also include one or more inlets in the pump base, an inlet being an opening to allow molten metal to enter the pump chamber.

A discharge is formed in the pump base and is a channel or conduit that communicates with the molten metal pump chamber, and leads from the pump chamber to the molten metal bath. A tangential discharge is a discharge formed at a tangent to the pump chamber. The discharge may also be axial, in which case the pump is called an axial pump. In an axial pump the pump chamber and discharge may be the essentially the same structure (or different areas of the same structure) since the molten metal entering the chamber is expelled directly through (usually directly above or below) the chamber.

A rotor, also called an impeller, is mounted in the pump chamber and is connected to a drive shaft. The drive shaft is typically a motor shaft coupled to a rotor shaft, wherein the motor shaft has two ends, one end being connected to a motor and the other end being coupled to the rotor shaft. The rotor shaft also has two ends, wherein one end is coupled to the motor shaft and the other end is connected to the rotor. Often, the rotor shaft is comprised of graphite, the motor shaft is comprised of steel, and the two are coupled by a coupling, which is usually comprised of steel.

As the motor turns the drive shaft, the drive shaft turns the rotor and the rotor pushes molten metal out of the pump chamber, through the discharge, which may be an axial or tangential discharge, and into the molten metal bath. Most molten metal pumps are gravity fed, wherein gravity forces molten metal through the inlet and into the pump chamber as the rotor pushes molten metal out of the pump chamber.

Molten metal pump casings and rotors usually, but not necessarily, employ a bearing system comprising ceramic rings wherein there are one or more rings on the rotor that align with rings in the pump chamber such as rings at the inlet (which is usually the opening in the housing at the top of the pump chamber and/or bottom of the pump chamber) when the rotor is placed in the pump chamber. The purpose of the bearing system is to reduce damage to the soft, graphite components, particularly the rotor and pump chamber wall, during pump operation. A known bearing system is described in U.S. Pat. No. 5,203,681 to Cooper, the disclosure of which is incorporated herein by reference. U.S. Pat. Nos. 5,951,243 and 6,093,000, each to Cooper, the disclosures of which are incorporated herein by reference, disclose, respectively, bearings that may be used with molten metal pumps and rigid coupling designs and a monolithic rotor. U.S. Pat. No. 2,948,524 to Sweeney et al., U.S. Pat. No. 4,169,584 to Mangalick, and U.S. Pat. No. 6,123,523 to Cooper (the disclosure of the afore-mentioned patent to Cooper is incorporated herein by reference) also disclose molten metal pump designs. U.S. Pat. No. 6,303,074 to Cooper, which is incorporated herein by reference, discloses a dual-flow rotor, wherein the rotor has at least one surface that pushes molten metal into the pump chamber.

The materials forming the molten metal pump components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Most often, circulation pumps are used in a reverbatory furnace having an external well. The well is usually an extension of a charging well where scrap metal is charged (i.e., added).

Transfer pumps are generally used to transfer molten metal from the external well of a reverbatory furnace to a different location such as a launder, ladle, or another furnace. Examples of transfer pumps are disclosed in U.S. Pat. No. 6,345,964 B1 to Cooper, the disclosure of which is incorporated herein by reference, and U.S. Pat. No. 5,203,681.

Gas-release pumps, such as gas-injection pumps, circulate molten metal while releasing a gas into the molten metal. In the purification of molten metals, particularly aluminum, it is frequently desired to remove dissolved gases such as hydrogen, or dissolved metals, such as magnesium, from the molten metal. As is known by those skilled in the art, the removing of dissolved gas is known as "degassing" while the removal of magnesium is known as "demagging." Gas-release pumps may be used for either of these purposes or for any other application for which it is desirable to introduce gas into molten metal. Gas-release pumps generally include a gas-transfer conduit having a first end that is connected to a gas source and a second submerged in the molten metal bath. Gas is introduced into the first end of the gas-transfer conduit and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where it enters the pump chamber. A system for releasing gas into a pump chamber is disclosed in U.S. Pat. No. 6,123,523 to Cooper. Furthermore, gas may be released into a stream of molten metal passing through a discharge or metal-transfer conduit wherein the position of a gas-release opening in the metal-transfer conduit enables pressure from the molten metal stream to assist in drawing gas into the molten metal stream. Such a structure and method is disclosed in U.S. application Ser. No. 10/773,101 entitled "System for Releasing Gas into Molten Metal", invented by Paul V. Cooper, and filed on Feb. 4, 2004, the disclosure of which is incorporated herein by reference.

Generally, a degasser (also called a rotary degasser) is used to remove gaseous impurities from molten metal. A degasser typically includes (1) an impeller shaft having a first end, a second end and a passage (or conduit) therethrough for transferring gas, (2) an impeller (also called a rotor), and (3) a drive source (which is typically a motor, such as a pneumatic motor) for rotating the impeller shaft and the impeller. The degasser impeller shaft is normally part of a drive shaft that includes the impeller shaft, a motor shaft and a coupling that couples the two shafts together. Gas is introduced into the motor shaft through a rotary union. Thus, the first end of the impeller shaft is connected to the drive source and to a gas source (preferably indirectly via the coupling and motor shaft). The second end of the impeller shaft is connected to the impeller, usually by a threaded connection. The gas is released from the end of the impeller shaft submersed in the molten metal bath, where it escapes under the impeller. Examples of rotary degassers are disclosed in U.S. Pat. No. 4,898,367 entitled "Dispersing Gas Into Molten Metal," U.S. Pat. No. 5,678,807 entitled "Rotary Degassers," and U.S. Pat. No. 6,689,310 to Cooper entitled "Molten Metal Degassing Device and Impellers Therefore," the respective disclosures of which are incorporated herein by reference.

Known coupling-to-impeller shaft connections are usually threaded, and gas can seep past the threaded connections, especially after the threads have been worn after operation of the degasser, causing the graphite threads of the impeller shaft to wear. The leaks waste gas, and if caustic gas such as chlorine is used, the gas can interact with nearby steel causing the steel to oxidize as well as releasing the caustic chlorine gas into the atmosphere creating an environmental hazard.

Another problem with conventional devices is that broken or worn impeller shafts are difficult to remove. The impeller shafts, also called "shafts," "degasser shafts," or "degasser impeller shafts," herein, are usually formed of graphite, silicon carbide or some combination thereof. The impeller shafts are typically connected to a coupling by a threaded connection wherein an internal cavity of a collar of the coupling is threaded and the external surface of the impeller shaft is threaded, and threadingly received in the internal cavity of the coupling. Stress is placed on the impeller shaft as it rotates and the shaft is weakened by the threads, so the impeller shaft tends to eventually break, and it typically breaks just below the coupling and the end still threaded into the coupling must be chiseled out, which is time consuming.

Another known way to couple an impeller shaft to a steel motor drive shaft is by threadingly connecting it to a threaded projection extending from the drive shaft. The projection comprises a threaded outer surface that is received in a threaded bore of the graphite impeller shaft. In this case, the single connection serves to both transfer torque to the impeller shaft and to create a gas-tight seal with a threaded bore in the impeller shaft. The impeller shaft is hollow, having an internal bore through which gas is transferred ultimately into the molten metal bath. Although this design allows for relatively easy removal of the impeller shaft if the shaft breaks, the impeller shaft is not supported or aligned by a coupling and the impeller shaft tends to wobble and the graphite threads in the bore wear quickly. As the fit loosens, the impeller shaft becomes more eccentric in its movement, i.e., it wobbles more, and eventually breaks.

One attempt to solve the problems associated with coupling a graphite shaft to a steel drive shaft is shown in U.S. Pat. No. 5,203,681 to Cooper entitled "Submersible Molten Metal Pump." This reference discloses a two-piece clamp held in position by a through bolt. Shafts retained by this clamp must include a cross axial bore to allow the bolt to pass through the shaft. This structure would not be used by one skilled in the art to couple a hollow shaft that functions as a gas-transfer conduit because gas could leak from the holes formed as part of the cross axial bore.

Further, many conventional devices do not adequately mix the gas being introduced into the molten metal. The gas can become trapped in a pocket within the impeller or rotor, or is otherwise not properly dispersed into the molten metal. Additionally, if rotated too fast in order to more thoroughly mix the gas and molten metal, "cavitation" can occur. Cavitation is when essentially a whirlpool is created that pulls air from the surface into the molten metal. This causes oxidation at the surface of the bath and slag or other impurities may be formed.

SUMMARY OF THE INVENTION

In accordance with the invention a rotary degasser for introducing gas into molten metal is disclosed. In one embodiment the degasser comprises: (1) an impeller (or degasser) shaft including a first end for connecting to a coupling without the use of threads and an internal passage that transfers gas; (2) an impeller coupled to a second end of the impeller shaft, wherein the impeller comprises: at least one impeller opening communicating with the impeller shaft passage, and the opening allows gas to escape into the molten metal under the impeller and enter at least one channel in the bottom of the impeller where it is directed to at least one cavity, which is preferably defined in part by a curved side of the impeller; and (3) a coupling having a collar that receives the first end of the impeller shaft and retains it without a threaded connection. The impeller shaft is preferably connected to a drive source by the coupling and the drive source turns the impeller shaft and the impeller. The impeller thereby displaces the molten metal while simultaneously gas is introduced into the molten metal through the opening.

An impeller of the invention may include at least a top surface and one cavity defined by a curved impeller side surface (or portion) juxtaposed an edge or other shearing structure. In the preferred embodiment, the distance from the center of each curved impeller side surface is closer to a center of the impeller than the distance from each of the shearing structures to the center of the impeller. One or more channels may be formed in the bottom surface of the impeller, wherein each channel extends from the opening in the bottom of the impeller to the center of a respective cavity. There may be four channels, wherein each extends to the center of a respective cavity. The impeller is preferably threadingly received onto the second end of the impeller shaft.

In one embodiment a coupling configured to be connectable to an impeller shaft preferably comprises an inner surface defining a smooth tapered, wall, and (2) at least one opening to receive a retention device, such as a set screw. An impeller shaft according to the invention is preferably not threadingly coupled to the coupling, so the coupling need not include threads.

Another impeller according to the invention has at least one cavity in a first vertical position and at least one cavity in a second vertical position, wherein the second vertical position is above the first vertical position. Preferably, there is a plurality of cavities in each of the two vertical positions. Each cavity is juxtaposed an edge, or other shearing structure. The impeller includes a gas release opening for allowing gas to escape under the impeller. At least some of the gas then enters the first and/or second cavity(ies), where it is mixed with molten metal as the rotor rotates. This impeller thus has two stages at which gas can be mixed with the molten metal.

Both the forgoing general description and the following detailed description are exemplary and explanatory only and are not restrictive of the invention as claimed. The accompanying drawings, which are incorporated in and constitute a part of this specification, illustrate embodiments of the invention and together with the description serve to explain the principals of the invention and not to limit the scope of the invention.

BRIEF DESCRIPTION OF THE DRAWINGS

FIGS. 8A-8D depict an impeller shaft according to one embodiment of the invention.

DETAILED DESCRIPTION OF PREFERRED EMBODIMENTS

Figure 1:
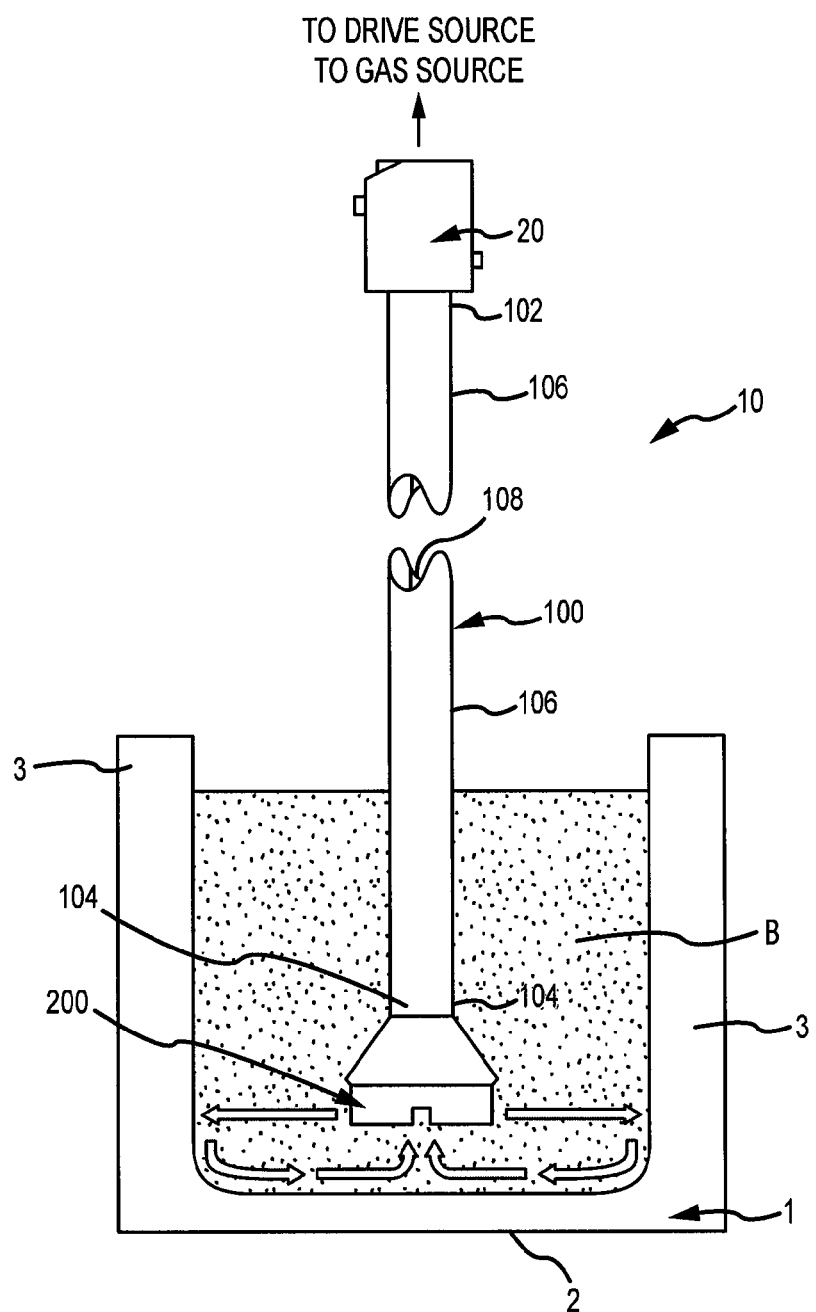
FIG. 1 is a perspective view of one embodiment of a rotary degasser according to the invention.

Reference will now be made in detail to the present exemplary embodiments of the invention, examples of which are illustrated in the accompanying drawings. FIG. 1 depicts a gas-release device 10 according to the invention. Device 10 is adapted to operate in a molten metal bath B contained within a vessel 1. Vessel 1 includes a bottom 2 and side walls 3. Vessel 1 may have any suitable size, shape, and configuration.

The exemplary rotary degasser 10 includes an impeller shaft 100 (also shown are shafts 100' and 100"), an impeller 200 and a coupling 20 for coupling the impeller shaft to the motor shaft of a drive source (not shown). Impeller shaft 100, impeller 200, and each of the impellers used in the practice of the invention, are preferably made of graphite impregnated with oxidation-resistant solution, although any material capable of being used in a molten metal bath, such as ceramic, or non-impregnated graphite could be used. Oxidation and erosion treatments for graphite parts are practiced commercially, and graphite so treated can be obtained from sources known to those skilled in the art.

The drive source can be any structure, system, or device capable of rotating shaft 100 and impeller 200 and is preferably a pneumatic motor or electric motor, the respective structures of which are known to those skilled in the art. The drive source can be connected to impeller shaft 100 in any suitable manner, but is preferably indirectly connected by a motor shaft that is connected to one end of coupling 20, whereas the other end (or collar) of coupling 20 is connected to a first end 102 of the impeller shaft 100. The motor shaft is preferably comprised of steel, comprises an inner passage for the transfer of gas, and is preferably in communication with a rotary union, which releases gas from a gas source into the motor shaft, as is known by those skilled in the art. A typical rotary union is a rotary union of the type described in U.S. Pat. No. 6,123,523 to Cooper, filed Sep. 11, 1998, the disclosure of which from page 9, line 21 to page 10, line 23, and FIGS. 4 and 4D, are incorporated herein by reference.

Figure 4:
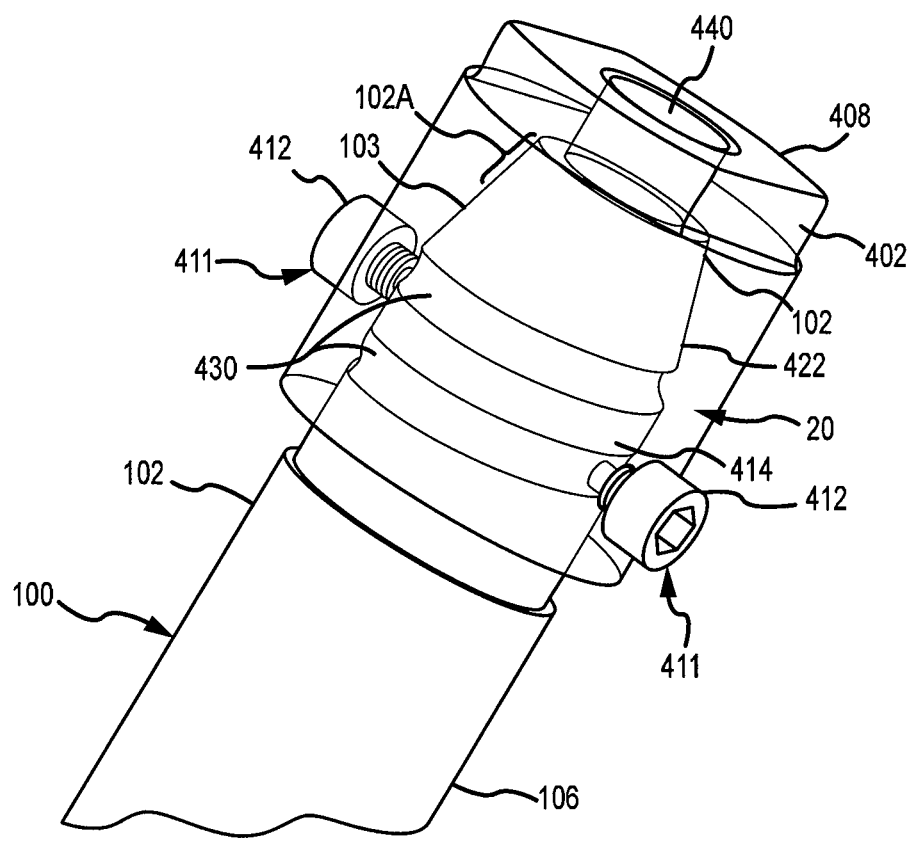
FIG. 4 depicts one embodiment of a coupling/impeller shaft connection according to the invention.
Figure 6:
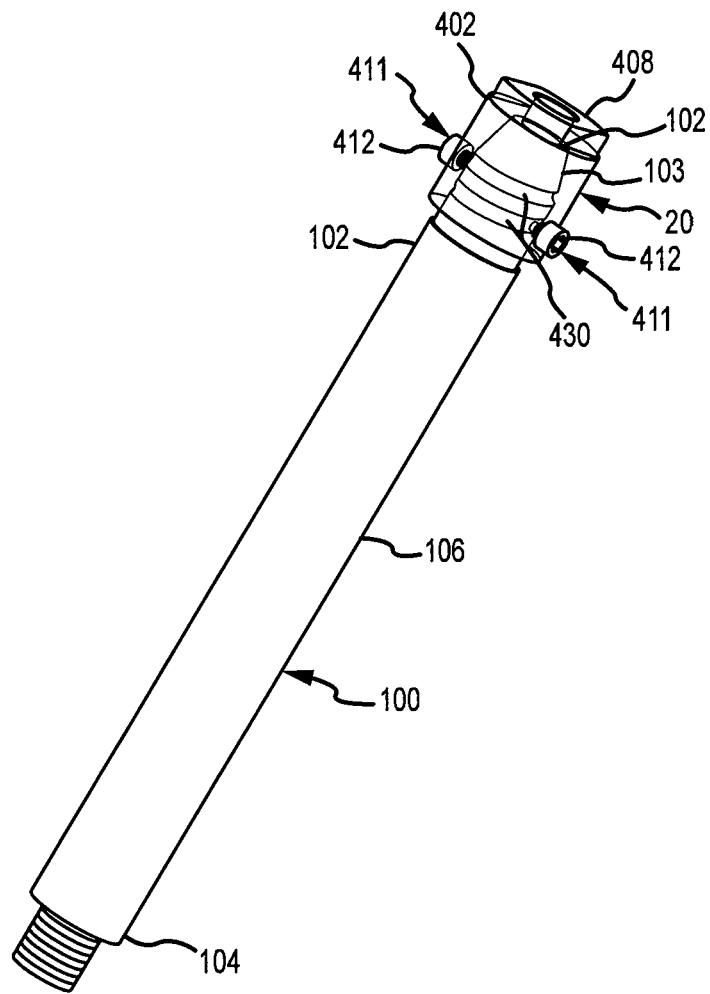
FIG. 6 depicts an embodiment of the coupling/impeller shaft connection as shown in FIG. 4, but showing the entire impeller shaft.

As is illustrated in FIGS. 1, 4 and 6, shaft 100 comprises a first end 102, a second end 104, a sidewall 106 and an inner passage 108 for transferring gas. Shaft 100 may be a unitary structure or may be a plurality of pieces connected together. The purpose of shaft 100 is to connect to an impeller to (1) rotate the impeller, and (2) transfer gas to the bottom surface of the impeller. Any structure capable of performing these functions can be used in conjunction with the present invention.

A preferred embodiment of the shaft 100 at end 102 is shown in FIGS. 4 and 6. In this embodiment, first end 102 (which is received in coupling 20) is tapered. It also comprises at least one groove 430 for receiving at least one retainer 411. In this exemplary embodiment, the groove 430 in shaft 100 is helical and extends along the shaft 100 such that preferably two or more retainers 411 (and preferably as many as four although any number may be used) can engage the groove at different positions to retain impeller shaft 100. As used herein with respect to end 102 of impeller 100, "groove" means any recess, indentation or structure designed to receive a retainer.

Figure 5A:
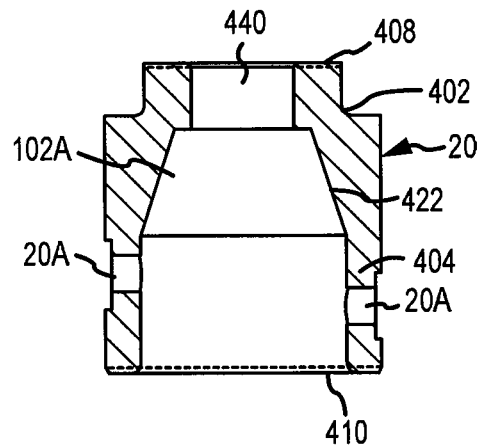
FIGS. 5A-5D depicts alternative views of the coupling shown in FIG. 4.
Figure 5B:
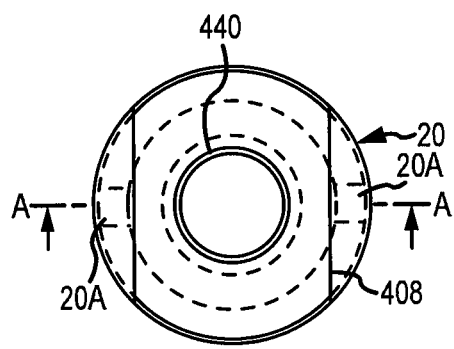
Figure 5C:
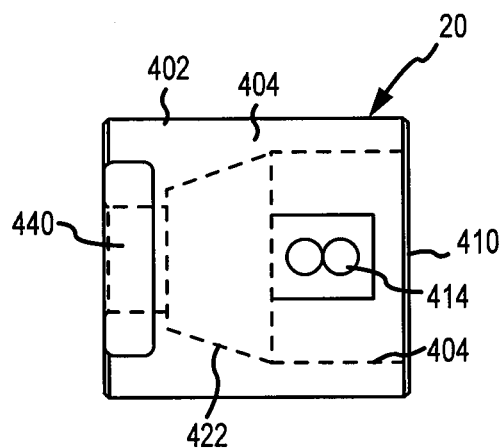
Figure 5D:
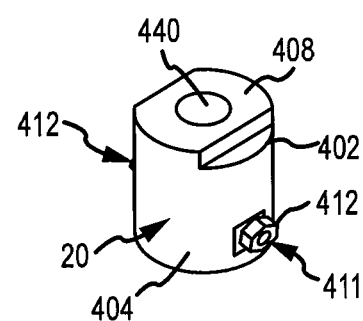

The tapered portion 102A of end 102 of the impeller shaft 100 aligns with an internal, tapered portion 422 of coupling 200, as seen in FIGS. 4, 5A and 5C. This alignment helps prevent gas from escaping between the tapered portion 102A of the impeller shaft 100 and the interior, tapered portion of the coupling 422. The groove 430 could extend onto the tapered portion 102A of the shaft 100, but it is preferred that the groove does not extend onto portion 102A, since it may then weaken end 102. The impeller shaft 100 is preferably threaded at second end 104 for being threadingly connected to impeller 200, although second end 104 may be configured to couple with the impeller 200 in any suitable manner.

An embodiment of a coupling according to the present invention is shown in FIGS. 4-6. Coupling 20 vertically and rigidly couples a motor shaft to an impeller shaft, such as impeller shaft 100. Referring to FIG. 5, coupling 20 is preferably a one-piece coupling incorporating two coupling members, first member 402 and second member 404. Member 402 can be any structure designed to connect to and receive suitable driving force from a motor shaft. In the preferred embodiment, coupling 402 is designed to receive a motor shaft (which is preferably cylindrical and/or keyed), within the opening 440 formed in the member 402. The motor shaft may be retained within the opening 440 in any suitable manner, such as by using set screws 412 positioned in apertures 20A of the coupling 20 (not shown) spaced about the circumference of member 402. In such a configuration, the set screws can be tightened against motor shaft to help retain shaft within the opening 440.

Second coupling member 404 (best seen in FIGS. 5A-5C) is configured to receive the impeller shaft 100 through opening 410. The coupling member 404 may engage the impeller shaft 100 in any suitable manner. In the present exemplary embodiment, one or more retainers 411 (which may include bosses, bolt-retention devices, cap screws or set screws 412) engage the shaft 100 through apertures 20A.

Figure 7A:
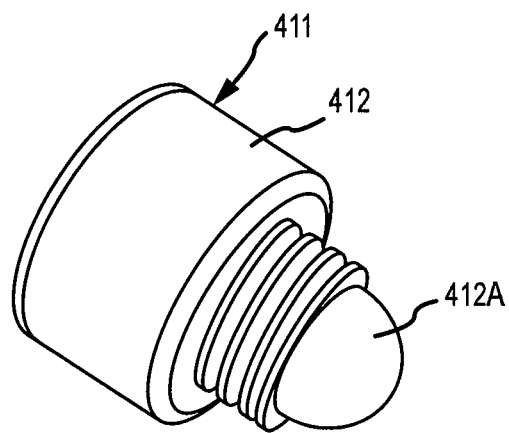
FIGS. 7A-7C depicts an embodiment of a set screw according to the invention.
Figure 7B:
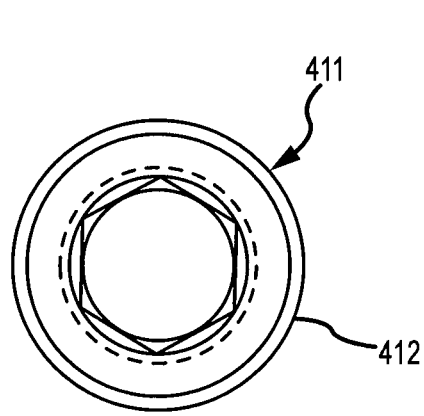
Figure 7C:
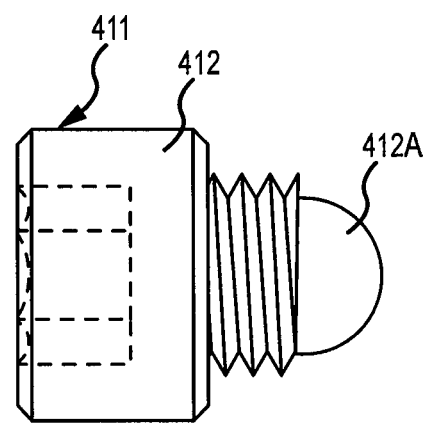
Figure 8D:
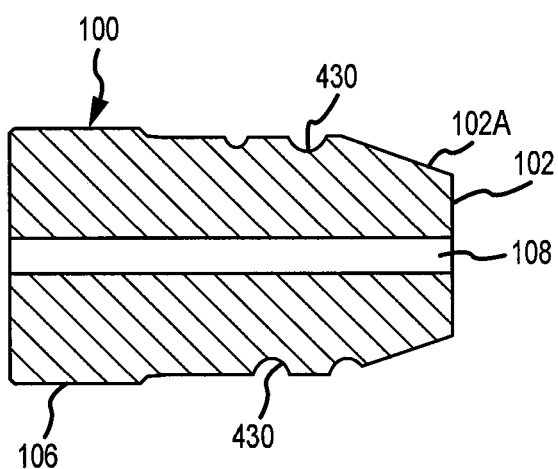

In one embodiment, referring now to FIGS. 7A-7C, each of two retention devices 411 comprises a set screw 412 that aligns with an aperture 20A formed in coupling member 404. Each set screw 412 is tightened to engage the shaft 100, preferably by using a tool, such as an Allen wrench, in order to secure shaft 100 in second coupling member 404. The threaded portion of each screw 412 preferably interfaces with corresponding threads around the aperture 414. The portion of each screw 412 that engages the impeller shaft 100 may be any size, shape, and configuration to retain the impeller shaft 100 within the coupling 20. In the exemplary embodiment depicted in FIGS. 7A-7C, the end of each set screw 412 is sized, shaped, and configured to engage a groove 430 formed in the surface of the impeller shaft 100.

When end 102 (as shown in FIGS. 8A-8D) is received in bore 404, tapered portion 103 of the impeller shaft 100 is received into the tapered portion 422. When these tapered, generally smooth surfaces align, the close fit helps to prevent gas leakage and helps to center the shaft 100 and reduce shaft vibration.

Turning now to FIGS. 2 and 3A-3E, embodiments of impeller 200 are shown. Impeller 200 is designed to displace a relatively large quantity of molten metal and thoroughly mix the gas being released into the molten metal. Therefore, impeller 200 can, at a slower speed (i.e., lower revolutions per minute (rpm)), mix the same amount of gas with molten metal as conventional devices operating at higher speeds. Impeller 200 can preferably also operate at a higher speed at which it would mix more gas and molten metal than conventional devices operating at the same higher speed.

Figure 10:
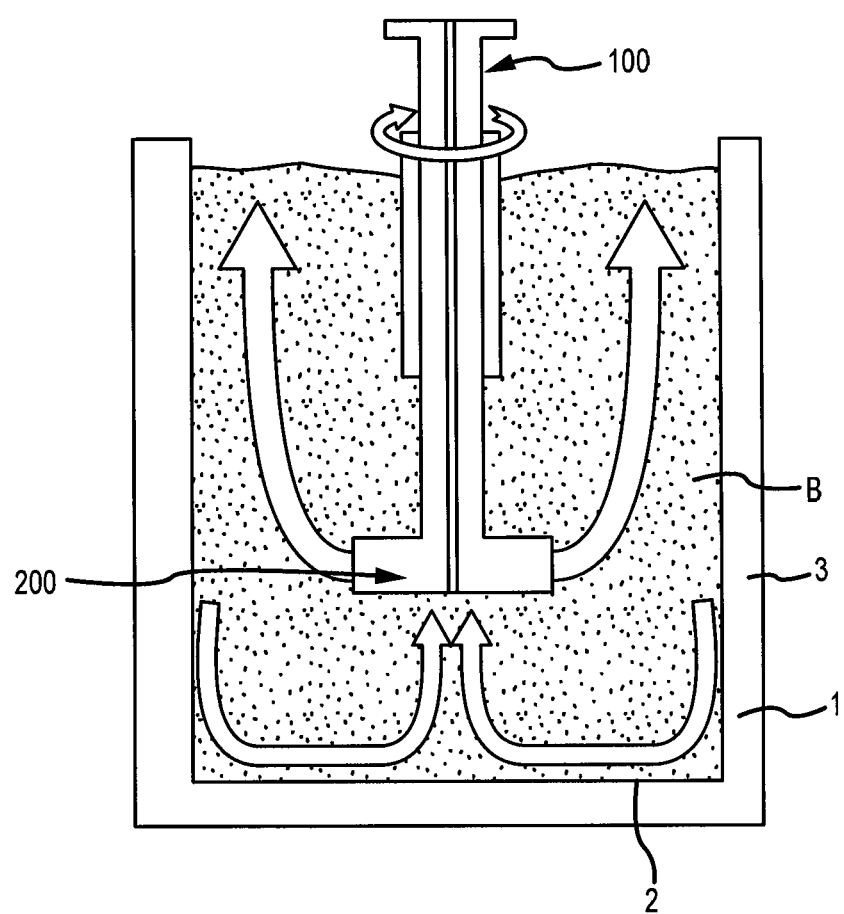
FIG. 10 depicts the flow of molten metal and gas mixture utilizing a rotary degasser according to the invention.

By operating impeller 200 at a lower speed less stress is transmitted to the moving components, which leads to longer component life, less maintenance and less downtime. Another advantage that may be realized by operating the impeller at slower speeds is the elimination of a vortex. Some known devices must be operated at high speeds to achieve a desired efficiency. This can create a vortex that draws air into the molten metal from the surface of bath B. The air can lead to metal ingots and finished parts that have air pockets, which is undesirable and/or to the formation of dross. As shown by the arrows in FIG. 10, for example, the impeller 200 of the present invention circulates gas throughout the molten metal bath B as it rotates without creating a vortex.

In one embodiment, impeller 200 comprises a top surface 202, sides 204, 206, 208 (not shown) and 210 (not shown) corners 212, 214, 216 and 218, and a lower surface 220. Impeller 200 is preferably imperforate, rectangular and most preferably square in plan view, with sides 204, 206, 208 and 210 being preferably equal in length. It also is possible that impeller 200 could be triangular, pentagonal, or otherwise polygonal in plan view. A connector (not shown) is formed in top surface 202. The connector is preferably a threaded bore that extends from top surface 202 to lower surface 220 and terminates in gas-release opening 223, though the impeller 200 can be connected to the shaft 100 in any suitable manner.

Figure 2:
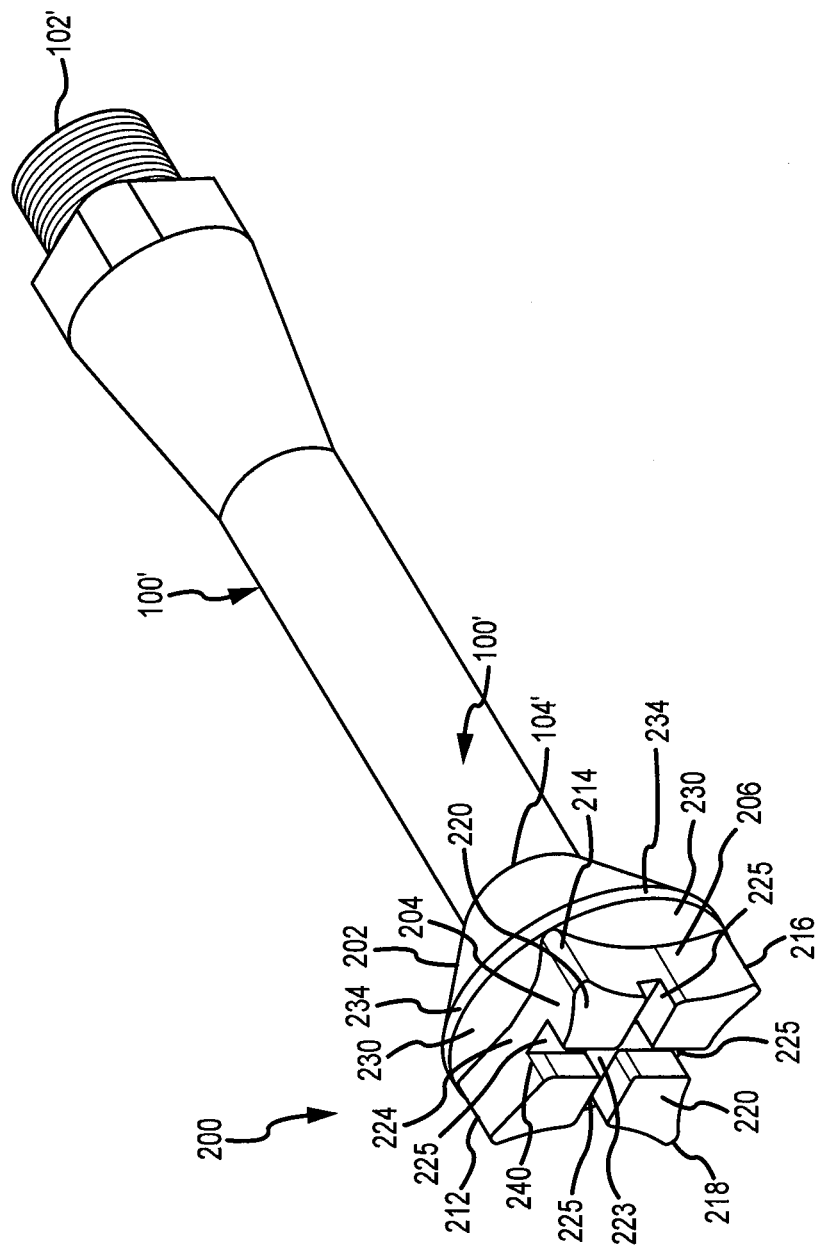
FIG. 2 is a perspective view of an impeller and impeller shaft according to one embodiment of the present invention.
Figure 3A:
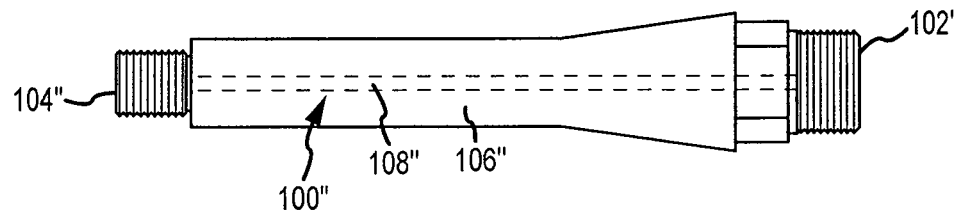
FIGS. 3A-3F are views of an alternate embodiment of an impeller and impeller shaft according to the invention.
Figure 3B:
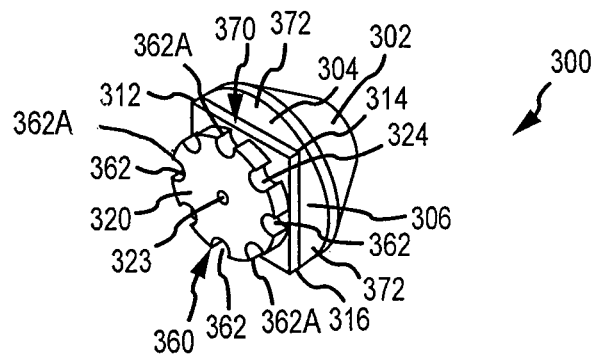
Figure 3C:
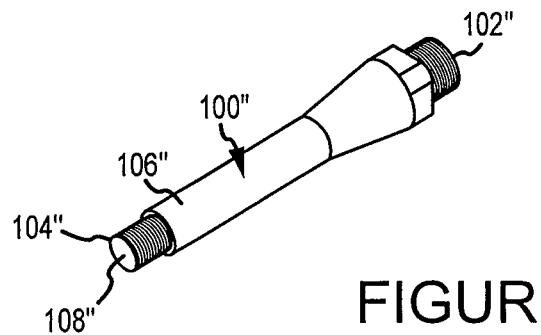
Figure 3D:
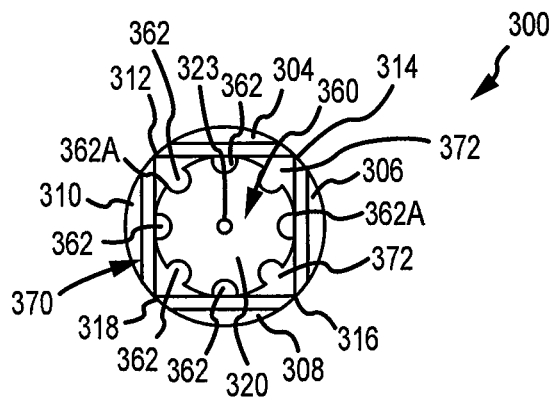
Figure 3E:
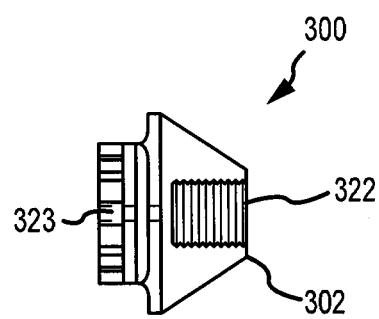
Figure 3F:
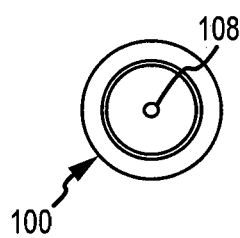

This exemplary impeller 200 includes one or more cavities 224 defined in part by each of curved sides 204, 206, 208 and 210, which are beneath upper surface 230. Each cavity 224 is preferably symmetrical about the center of its respective side (204, 206, 208, or 210), although one or more of the cavities could be formed off center from its respective side. The cavities need not be identical to each other as long as gas escaping through the gas-release opening enters each cavity where it is ultimately mixed with the molten metal entering the cavity. The invention could function with fewer than or more than four cavities 224. Additionally, the cavities may be formed in any portion of impeller 200, rather than being formed at 90-degree intervals by the sides (204, 206, 208, or 210) as shown in FIG. 2. Additionally, a cavity may have any suitable size, shape, and configuration.

In the present exemplary embodiment, each cavity preferably comprises an identical structure, therefore only one cavity 224 shall be described. Cavity 224 is partially defined by concave side surface 204, wherein the distance from the center of the curved surface 204 is closer to a center of the impeller 200 than the distance from ends (212, 214) of the curved surface 204 to the center of the impeller 200. Cavity 224 is further defined by upper surface 230. In the present exemplary embodiment, surface 230 of the impeller 200 is substantially flat and circular as viewed from the bottom of the impeller 200.

The impeller 200 may comprise one or more channels 225 in the bottom surface 220 of the impeller 200. The channels 225 may be any size, shape, and configuration. In the present exemplary embodiment, the device comprises four channels 225, one that extends to in each of the four side cavities.

The edges, such as edges 212, 214, 216 and 218, act as sheering surfaces to break apart gas bubbles into smaller bubbles as the rotor 200 rotates. The impeller 200 is threadingly received onto the impeller shaft. A lip 234 is formed between top wall 230 and top surface 202; lip 234 preferably comprises a minimum width of one quarter of an inch. Lower surface 220 comprises edges 240 juxtaposed each of the recesses 224. The impeller 200 is comprised of a heat resistant material such as graphite or ceramic.

In one embodiment, the second end 104 of shaft 100 is preferably connected to impeller 200 by threading end 104 into a connector (not shown) on the impeller. If desired, shaft 100 could be connected to impeller 200 by techniques other than a threaded connection, such as by being cemented, pinned or in any other suitable manner. The use of coarse threads (4 pitch, UNC) facilitates manufacture and assembly. The threads may be tapered.

Upon placing impeller 200 in molten metal bath B and releasing gas through passage 108, the gas will be released through gas-release opening 223 and at least some will flow outwardly through the channels 225 in lower surface 220, and into each cavity.

As impeller 200 turns, the gas in each of cavities 224 mixes with the molten metal entering the cavity and this mixture is pushed outward from impeller 200. The released gas will also be sheared into smaller bubbles as they are struck by a shearing surface when rotor 200 rotates.

By using impeller 200, high volumes of gas can be mixed with the molten metal at relatively low impeller speeds. Unlike some conventional devices that do not have cavities, the gas cannot simply rise past the side of the impeller 200. Instead at least some of the gas enters the cavities 224 and is mixed with the molten metal.

An alternate, impeller 300 is shown in FIGS. 3A-3F. Impeller 300 is preferably imperforate, formed from graphite and connected to, and driven by, a shaft such as shaft 100 or shaft 100". Impeller 300 further includes a connective portion 304, which is preferably a threaded bore, but can be any structure capable of drivingly engaging shaft 100.

Impeller 300 includes two sets of cavities, wherein each set is at a different vertical position, that can capture gas and mix it with molten metal. Thus, impeller 300 is a two-stage impeller with respect to mixing gas and molten metal. Impeller 300 comprises a top surface 302, a bottom surface 320, a first stage 360 and a second stage 370. First stage 360 includes a plurality of cavities 362 wherein each cavity is juxtaposed by at least one edge, or other shearing structure, 362A.

Impeller 300 also has a second stage 370 that includes four sides 304, 306, 308 and 310 four corners 312, 314, 316 and 318, and cavities 372. Impeller 300 is preferably imperforate, and rectangular (and most preferably square in plan view, with sides 304, 306, 308 and 310 being preferably equal in length). It also is possible that impeller 300 could be triangular, pentagonal, or otherwise polygonal in plan view. A connector 322 is formed in top surface 302. The connector is preferably a threaded bore that extends from top surface 302 to lower surface 320 and terminates in gas-release opening 323, though any other suitable connector may be used.

One or more cavities 372 are formed in part by sides 304, 306, 308 and 310. Each cavity 372 is preferably symmetric about the center of its respective side, although one or more of the cavities could be formed off center. Further, the invention could function with fewer than or more than the cavities shown. Additionally, the cavities may be formed in any suitable portion of impeller 300 and may be of any suitable size, shape, or configuration.

An impeller 300 rotates, gas is released through opening 323 and at least some of the gas enters the one or more cavities 362 and the one or more cavities 372. The respective edges, or other shearing structures 362A and 372A break the gas into smaller bubbles as rotor 300 rotates thereby helping to disperse the gas into the molten metal.

Figure 9:
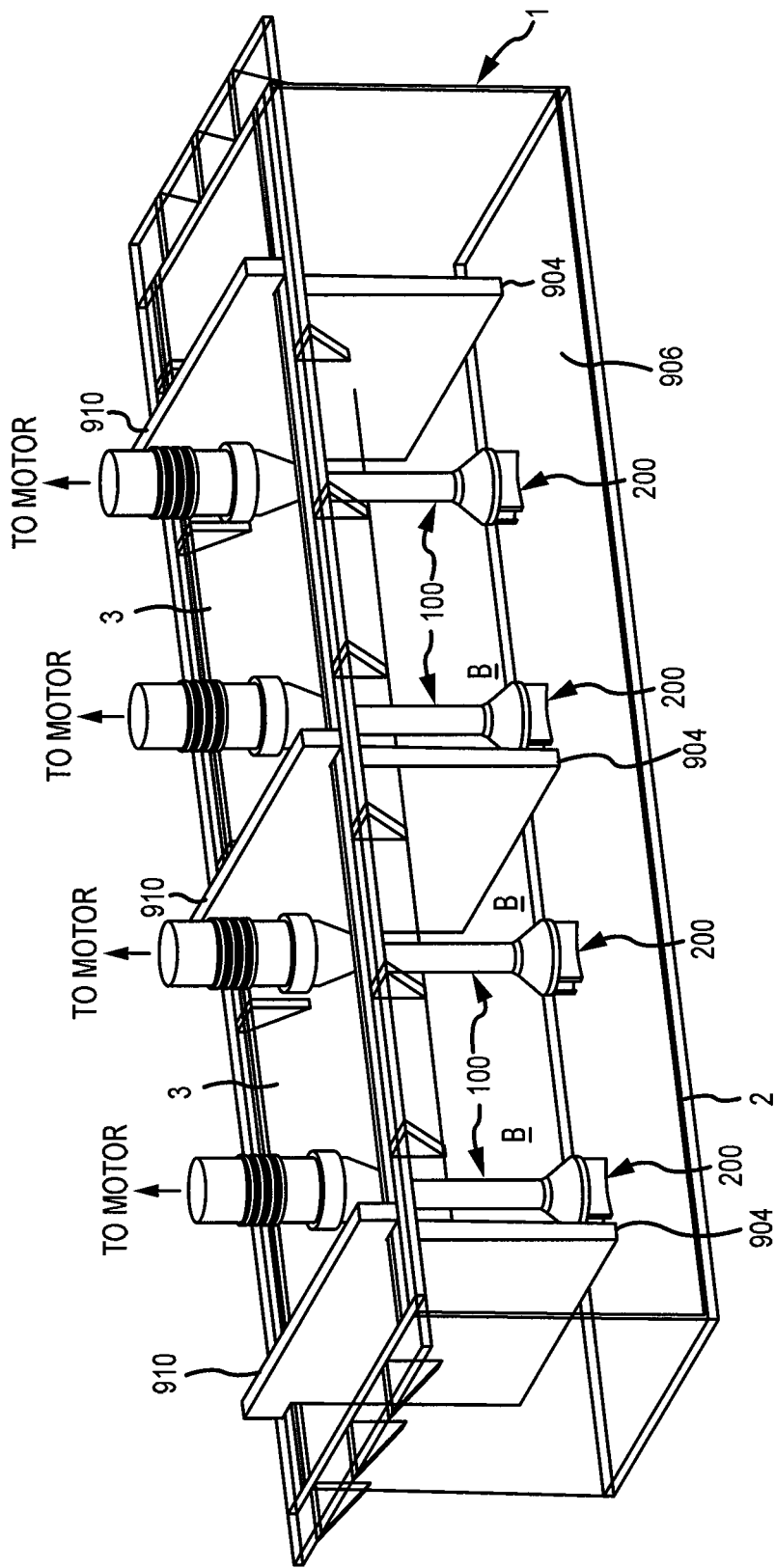
FIG. 9 depicts a plurality of rotary degassers according to the invention separated by dividers in a molten metal bath.

Referring now to FIG. 9, any number of molten metal degassers of the present invention, as described above, may be employed in a molten metal bath B. In this exemplary embodiment, a plurality of degassers are disposed in a molten metal bath B separated by dividers 910. The dividers 910 may be made out of any suitable heat resistant material. In the preferred embodiment they are made from the same material as the walls of the molten metal bath B. The dividers 910 may be any suitable size, shape, and configuration and may partially or completely separate portions of the vessel 1. In one embodiment, the dividers 910 couple to the top surface of the molten metal bath B; however, the dividers 910 may couple to any wall of the vessel 1 such as a side wall 3, bottom surface 2, or be suspended by an alternative support structure. The dividers 910 may be coupled to the vessel 1 in any suitable manner, such as by pressure fitting, cementing, clamping, welding, and/or being formed as part of the vessel. The dividers 910 are may be positioned in various locations within the vessel 1 or bath B. In some embodiments the placement of the dividers 910 may travel the entire length of the vessel 1 (they may be placed in any position) and may be repositioned into a different location with ease. The dividers 910 may divide each degasser, two degassers or more than two degassers. Any suitable number of dividers 910 may be implemented. Multiple dividers 910 may be made of different materials, different dimensions and sizes, and may comprise different openings for molten metal to pass through.

As shown in FIG. 9, there is preferably no gap between the sides of the divider 910 and the side walls 3 of vessel 1, as the divider 910 runs the entire width of the molten metal bath. In this embodiment, there is a gap between the bottom surface 906 of the molten metal bath B to the bottom most edge 904 of divider 910 to allow molten metal to flow between the chambers.

Having thus described some embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:
1. A rotary degasser for introducing gas into molten metal, the rotary degasser comprising:
an impeller shaft, the impeller shaft comprising a gas-transfer conduit and having a first end that includes one or more grooves and is not threaded, and a second end;
a coupling coupled to the first end of the impeller shaft and including a plurality of retainers, each retainer having a first end received in one of the one or more grooves in order to retain the first end of the impeller shaft;
an impeller connected to the second end of the impeller shaft, wherein the impeller comprises:
at least one impeller opening communicating with the gas-transfer conduit;
at least one open channel juxtaposed the opening;
at least one cavity comprising top surface and at least one curved impeller side surface and the at least one of the channels is in communication with the curved impeller side surface; and
wherein the at least one channel guides gas exiting the opening to the at least one cavity of the impeller.
2. The rotary degasser of claim 1 that further includes a drive source.
3. The rotary degasser of claim 2, wherein the drive source is a pneumatic motor.
4. The rotary degasser of claim 2, wherein the device further includes a drive shaft, the drive shaft comprising the impeller shaft coupled to a motor shaft by the coupling.
5. The rotary degasser of claim 1 that further includes a gas source.
6. The rotary degasser of claim 5, that further includes a motor shaft and the gas source introduces gas into the motor shaft.
7. The rotary degasser of claim 1, wherein the impeller has a top surface, a bottom surface and a plurality of cavities, wherein each cavity is defined by a curved side surface and a top surface.
8. The rotary degasser of claim 7, wherein the top surface has an outer perimeter and at least part of each of the one or more curved side surfaces is inside the outer perimeter of the top surface.

9. The rotary degasser of claim 8 that has four cavities.

10. The rotary degasser of claim 9 that has four channels and each channel leads to the center of one respective curved side surface.

11. The rotary degasser as defined in claim 1, wherein each cavity is juxtaposed a shearing structure.

12. The rotary degasser of claim 11, wherein each shearing structure is an edge of a curved surface that partially forms the cavity.

13. The rotary degasser as defined in claim 1, wherein the impeller is comprised of graphite.

14. The rotary degasser as defined in claim 1, wherein the impeller is threadingly received onto the second end of the impeller shaft.

15. The rotary degasser as defined in claim 1, wherein the retainer is at least one set screw.

16. The rotary degasser as defined in claim 1, wherein the coupling comprises a tapered interior surface for receiving the impeller shaft.

17. The rotary degasser as defined in claim 1, wherein the impeller shaft comprises at least one groove for receiving one or more retainers.

\* \* \* \* \*